United States Patent [19]
Pan et al.

[11] Patent Number: 6,049,645
[45] Date of Patent: *Apr. 11, 2000

[54] 1XN AND NXN FIBER OPTIC COUPLERS

[75] Inventors: Jing-Jong Pan; Ming Shih, both of Milpitas; Weiti Wu; Yu-Li Ko, both of San Jose; Donna S. Yu, Danville, all of Calif.

[73] Assignee: E-Tek Dynamics, Inc., San Jose, Calif.

[*] Notice: This patent is subject to a terminal disclaimer.

[21] Appl. No.: 08/986,760

[22] Filed: Dec. 8, 1997

Related U.S. Application Data

[63] Continuation of application No. 08/746,604, Nov. 13, 1996, Pat. No. 5,764,830.

[51] Int. Cl.⁷ .................................................. G02B 6/26
[52] U.S. Cl. .......................... 385/39; 385/46; 385/43; 385/50; 65/385
[58] Field of Search ........................... 385/39, 43, 46, 385/27, 50, 42; 65/385, 406, 408, 409, 410

[56] References Cited

U.S. PATENT DOCUMENTS

| | | | |
|---|---|---|---|
| 4,240,694 | 12/1980 | Pan ........................................ | 350/96.16 |
| 5,594,822 | 1/1997 | Berkey ..................................... | 385/43 |
| 5,664,037 | 9/1997 | Weidman ................................. | 385/46 |
| 5,764,830 | 6/1998 | Pan et al. ................................. | 385/39 |

OTHER PUBLICATIONS

Arkwright et al. "Monolithic 1x19 Single–Mode Fused Fibre Couplers," *Electronics Letters* 27(9):737–738 (Apr. 25, 1991).

Arkwright, J.W. "Novel Structure For Monolithic Fused–Fibre 1x4 Couplers," *Electronics Letters* 27 (19):1767–1769 (Sep. 12, 1991).

Cryan et al. "Wavelength–Insensitive Single–Mode Fused Tapered 1xN Couples," *OFC '96 Technical Digest* Thursday afternoon, 1:45 p.m.:pp. 243–244 (1996).

Huang et al. "Vector Coupled–Mode Calculation of Guided Vector Modes on an Equilateral Three–Core Optical Fiber," *IEEE Microwave and Guided Wave Letters* 1(3):57–59 (Mar., 1991).

Kale, Michael B. "Performance of Lightly–Fused, Sharply–Tapered 3x3 Single–Mode Fiber Optic Couplers," *Components for Fiber Optics Applications II* 839:48–57 (1987).

Mortimore et al. "Monolithic Wavelength–Flattened 1x4 Singlemode Fused Fiber Coupler," *Electronics Letters* 27:24:2252–2253 (Nov. 21, 1991).

(List continued on next page.)

*Primary Examiner*—Phan T. H. Palmer
*Attorney, Agent, or Firm*—Townsend & Townsend & Crew LLP

[57] ABSTRACT

The present invention provides fiber optic couplers for use with at least three optic fibers. The optic fibers arranged in a linear array, that is, the optic fibers are coupled side by side. The fibers along either end of the linear-array are coupled only to a single fiber, while the remaining fibers are generally coupled between only two adjacent fibers. Generally, at least one of the fibers has a propagation constant different that the other fibers. Such variations in the propagation constant are used to vary the coupling coefficients among the fibers of the linear-array, thereby providing a repeatable mechanism, to vary coupled power ratios among the fibers of the coupler. Theoretical calculations and empirical experience have shown that varying the propagation constant of fibers among a linear-array, generally by pre-pulling the fibers by varying amounts, allows repeatable manufacturing of 1x3, 1x4, 4∴3, 1xN and even NxN fiber couplers having even coupled power ratios.

7 Claims, 14 Drawing Sheets

OTHER PUBLICATIONS

Mortimore et al. "Monolithic Wavelength–Flattened 1x7 Single–Mode Fused Fiber Couplers: Theory, Fabrication, and Analysis," *Applied Optics* 30(6):650–659 (Feb. 20, 1991).

Mortimore et al. "Performance Tuning of 1x7 Wavelength–Flattened Fused Fibre Couplers," *Electronics Letters* 26(18):1442–1443 (Aug., 1990).

Mortimore, D.B. "Polarization Dependence of 4x4 Optical Fiber Couplers," *Applied Optics* 30(21):2952–2956 (Jul. 20, 1991).

Mortimore, D.B. "Theory and Fabrication of 4x4 Single–Mode Fused Optical Fiber Couplers," *Applied Optics* 29(3):371–374 (Jan. 20, 1990).

1XN AND NXN FIBER OPTIC COUPLERS

This application is a continuation of U.S. patent application Ser. No. 08/746,604 filed Nov. 13, 1996 is now U.S. Pat. No. 5,764,830.

BACKGROUND OF THE INVENTION

The present invention is related to fiber optic technology, and more particularly, to fiber optic couplers for single mode optic fibers.

Modern fiber optic networks generally use single mode optic fibers to transmit light signals having a particular wavelength. Such networks typically have numerous couplers by which a signal on one fiber is distributed to two or more fibers. In a typical coupler, a single input fiber joins two output fibers to form a 1×2 coupler, or two input fibers join two output fibers to form a 2×2 coupler. Previously, a number of these simple couplers were connected together in series to provide coupling between larger numbers of input and output fibers. More recently, monolithic 1×N and N×N couplers have been proposed to couple larger numbers of fibers.

A wide variety of monolithic coupler geometries have been proposed. These known monolithic optic couplers have generally been formed as tight bundles, in which each optical fiber is coupled to several surrounding optical fibers, or on occasion, to a central optical element in an axisymmetric arrangement. The interaction within these coupled structures can be quite complex, in part because the fused optical elements may form a waveguide which supports several propagation modes. Further complicating any analysis of these monolithic 1×N and N×N couplers is the real world existence of non-uniformity in the optical fiber bundle. The complex results of unequal fiber fusing in a simple triangular optic fiber bundle were analyzed by B. Michael Kale in "Performance of Lightly-Fused, Sharply-Tapered 3×3 Single Mode Fiber Optic Couplers," SPIE PROC., Vol. 839, *Components For Fiber Optic Applications II*, 1987, pp. 48–57. Where larger numbers of fibers are bundled together, analysis of these dimensional errors gets more complex, and the resulting non-uniformity in coupled power ratios may become more difficult to calculate and to avoid. Geometric distortion and the resulting inaccuracy in coupled power ratios appears to be difficult to eliminate within known bundled fiber geometries, particularly when the bundles of optical fibers are tightly bound within capillary tubes prior to tapering. Nonetheless, a wide variety of such bundled and clad monolithic fiber couplers have been proposed.

Another problem with many known optic couplers is that the coupled power ratios provided at the output tends to be wavelength dependent. Although the semiconductor lasers used to generate signals for modern optic networks are nominally coherent, the actual light signals produced are typically no more precise than ±30 nanometers of the nominal wavelength. To properly distribute these fairly noisy semiconductor laser generated signals, it is generally desirable that couplers distribute the signals properly regardless of the actual signal wavelength. In other words, it is generally preferable to provide couplers which are insensitive to wavelength variations. This helps to ensure that the strength of the signal on an arbitrary branch of a fiber optic network will be coupled properly.

While known 1×N and N×N optical couplers have been found to have advantages over couplers built up with several 1×2 or 2×2 devices, it is desirable to provide monolithic optical fiber couplers having improved wavelength response for high performance fiber optic networks. Furthermore, the described coupler fabrication techniques have proved to difficult to implement, and predictably and reliably reproducing desired coupled power ratios has proved to be particularly problematic. Without predictability, reproducibility, and manufacturability, the cost for these couplers has remained high, and implementation of fiber optic networks has thereby been inhibited.

SUMMARY OF THE INVENTION

The present invention provides monolithic 1×N and N×N fiber optic couplers having a linear-array geometry, that is, the optic fibers are coupled side-by-side in a single row. The fibers along either edge of the linear-array are coupled only to a single inner fiber along at least a position of the linear array, while the inner fibers are coupled between two adjacent fibers. Generally, at least one of the fibers has a propagation constant different than an adjacent fiber. Such variations in the propagation constants among the fibers of a linear-array provide a controllable, repeatable mechanism to vary the coupling coefficients of the individual fused joints between adjacent fibers. Theoretical calculations and empirical experience have shown that a linear-array geometry of dissimilar optic fibers in a twist-parallel-twist coupler arrangement will allow repeatable manufacturing of 1×4, 4×4, 1×N, and even N×N fiber couplers having even coupled power ratios. Alternatively, through a combination of the linear-array geometry, the twist-parallel-twist coupler arrangement, and controlled pre-pulling of selected fibers, optic couplers having any of a variety of alternative desirable power split characteristics can be produced.

In a first aspect, the present invention provides a fiber optic coupler comprising at least four optic fibers. The optic fibers are coupled together along a coupled length, and have input and output ends extending from that coupled length. At least two of the optic fibers comprises inner fibers which are coupled between two adjacent optic fibers. Two of the optic fibers comprise edge fibers which are each coupled directly only to one of the other fibers along the coupled length. A propagation constant of a first of the optic fibers is different than propagation constants of a second optic fiber along the coupled length, and output light signals of substantially equal power are produced at the output ends of the fibers when a light signal is introduced at the input end of one of the fibers.

In another aspect, the present invention provides a fiber optic coupler comprising a plurality of optic fibers, each optic fiber defining an axis. The optic fibers are coupled along a coupled length, and a propagation constant of a first of the optic fibers is different than propagation constants of second and third fibers along the coupled length. A first twist is defined by a first axial portion of two of the optic fibers, each of the twisted optic fibers at the first twist having a pitch. A second twist is similarly defined by a second axial portion of the twisted optic fibers, each of the twisted optic fibers at the second twist also having a pitch. A substantially parallel portion is disposed between the first twist and the second twist. The pitch of the parallel portion is less than the pitch of the twisted optic fibers at the first and second twists, and the coupled length extends along at least a portion of the parallel portion. The optic fibers are coupled side-by-side in a single row to define a linear-array along the parallel portion, and the twisted optic fibers are disposed along opposed edges of the linear-array.

Generally, the ratios of coupling coefficients between adjacent axial fibers varies across the linear array. This variation in coupling coefficient ratios, which can be achieved by simple pre-pulling of alternating optic fibers, allows predetermined arbitrary power coupling ratios to be achieved by varying the coupled length and monitoring the coupler's performance.

In another aspect, the present invention provides a fiber optic coupler comprising at least three optic fibers. Each fiber has a core and a surrounding cladding, an input end, and an output end. The fibers are coupled along a coupled length between the input and output ends, and a propagation constant of a first of the fibers is different than that of an adjacent second optic fiber. Coupled power ratios between one of the input ends and the output ends of at least two of the optic fibers are substantially equal over a range of light signal frequencies. However, a coupled power ratio between one of the output ends and the input end is lower than the equal power ratios. Surprisingly, the presence of this low-power fiber enhances the frequency range of light signals that provide the equal power ratios.

In another aspect, the present invention provides a method for fabricating optic fiber couplers. At least three optic fibers are provided, at least one of the optic fibers having a propagation constant which is different than another of the optic fibers. The fibers are arranged side-by-side in a single row so that two edge fibers are disposed along opposed edges of the row. The fibers are fused together into a linear-array along a coupled length. The fibers are heated and pulled axially to increase the coupled length. The heating and pulling steps are stopped when the optic fibers exhibit predetermined coupled power ratios. Advantageously, the predetermined coupled power ratios of the stepping step may comprise any of a plurality of alternative target coupling characteristics described hereinbelow.

In another aspect, the present invention provides a method for fabricating optic fiber couplers. The method comprises providing at least three optical fibers, one having a propagation constant which is different than a propagation constant of another. The fibers are fused along a coupled length between input ends and output ends of each of the fibers, and are heated along the coupled length and pulled axially to increase the coupled length. The heating and pulling steps are stopped when the fibers exhibit any of a plurality of alternative predetermined coupling characteristics between any of the input ends and the output ends.

DETAILED DESCRIPTION OF THE SPECIFIC EMBODIMENTS

The present invention provides linear-array fiber optic couplers and methods for their production. The side-by-side coupling of the optic fibers within these linear-arrays, in combination with controlled variation in the ratios of coupling coefficients between adjacent fibers, allows predicable and repeatable manufacturing processes to be employed which can produce a wide variety of advantageous power-splitting characteristics. Variations in coupling coefficient ratios are typically provided by pre-pulling selected optical fibers so as to vary their propagation constants.

Referring now to FIGS. 1A–1J, a wide variety of mono-lithic coupler cross-sectional geometries have previously been proposed. Typically, optic fiber couplers are formed by fusing a plurality of optic fibers 10. These optic fibers, in turn, are each formed from a central core 12 surrounded by a cladding 14. In modern optic fiber networks, core 12 is typically as small as 2 to 10 micrometers, so that each independent fiber will support only a single mode of light propagation. However, by fusing a multiple discreet optic fibers together, light is able to propagate from a core, through the cladding of the two fibers, and into the adjacent core. Unfortunately, as more and more optical fibers are bundled together, light propagating along the wave guide provided by the combined optic fibers can propagate in a rapidly increasing number of modes.

Figure 1A:
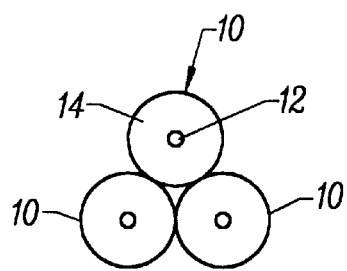
FIGS. 1A–1J illustrate known bundled or axisymmetric fiber optic couplers having three or more optic fibers.
Figure 1B:
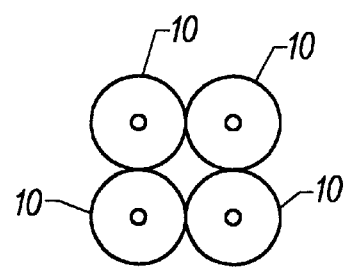
Figure 1C:
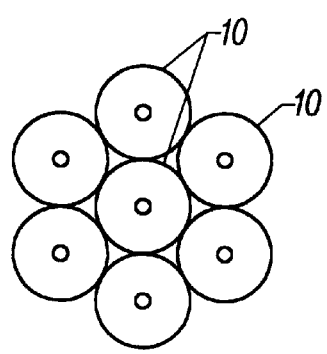
Figure 1D:
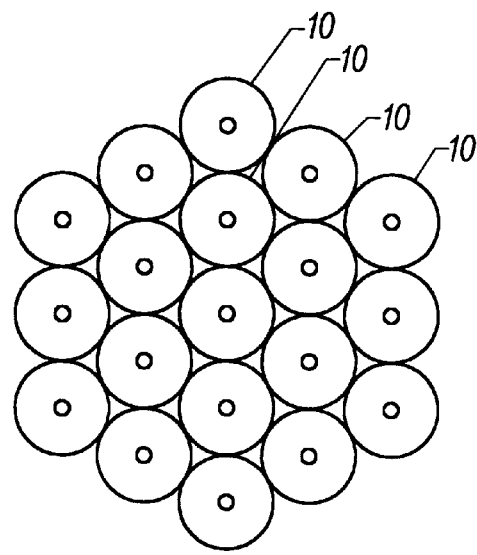
Figure 1E:
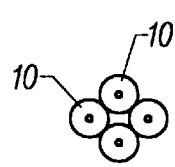
Figure 1F:
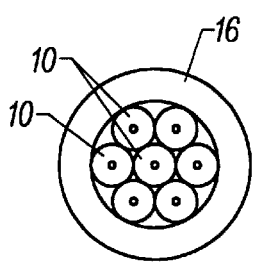
Figure 1G:
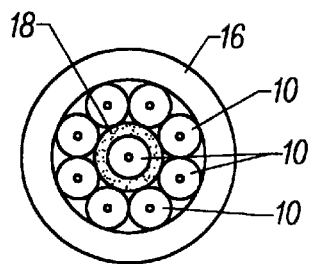
Figure 1H:
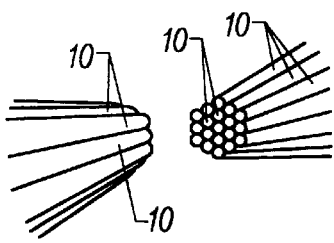
Figure 1I:
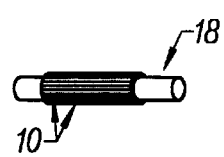
Figure 1J:
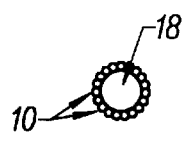

Additionally, evenly and predictably fusing just three optic fibers in a triangular arrangement, as illustrated in FIG. 1A, can be problematic. As described by B. Michael Kale in an article entitled "Performance of Lightly-Fused, Sharply-Tapered 3×3 Single-Mode Fiber Optic Couplers," *Components For Fiber Optic Applications II*, SPIE, Vol. 839 (1987), triangular fused couplers often end up quite distorted during the manufacturing process, so that the fused connections between fibers are uneven. Such uneven fusing is especially problematic in couplers having larger numbers of fibers, such as those shown in FIGS. 1C and 1D. Alternative fiber based couplers have included capillary tubes 16 surrounding the fibers, or central wave guides 18, such as the fluorine doped rod illustrated in the known coupler embodiment shown in FIGS. 1I and 1J.

Although individual optic fiber couplers have been successfully produced in several of the configurations illustrated in FIGS. 1A–1J, including individual couplers having fairly even power-splitting characteristics, these known optic fiber couplers generally suffer from high loss, uneven power sharing, high manufacturing costs, high rejections rates, and/or difficulty in correlating the anticipated and actual coupling performance.

Figure 2A:
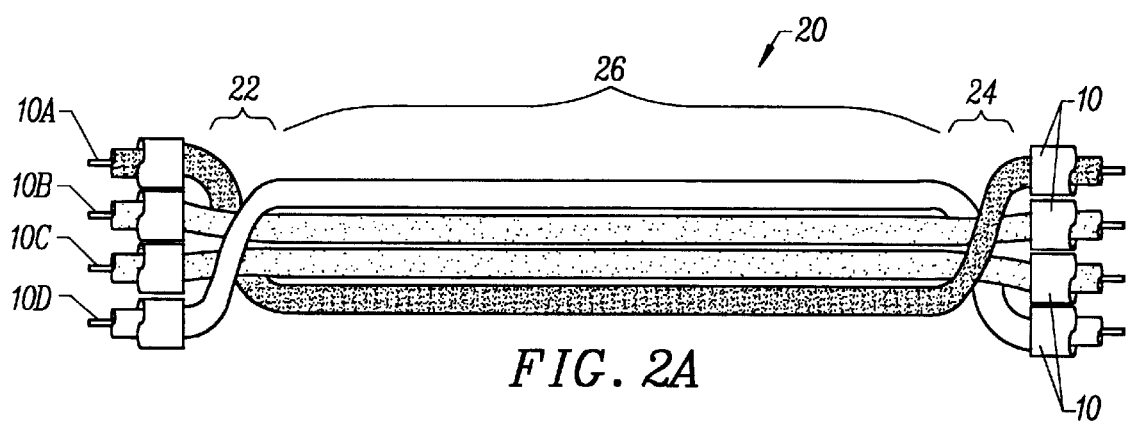
FIGS. 2 and 2A illustrate a fiber optic coupler having four optic fibers arranged in a linear array, in which alternating fibers have been pre-pulled to vary their propagation constants and the coupling coefficients of the fused joints between the fibers, according to the principles of the present invention.
Figure 2B:
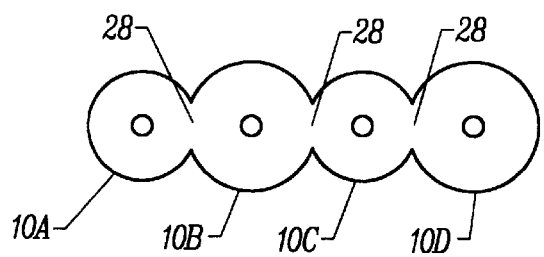

Referring now to FIG. 2, a linear-array fiber optic coupler 20 comprises four optic fibers 10A–10D. These fibers are arranged side-by-side along a substantial portion of the length of the coupler, in which fiber 10A is directly adjacent only to fiber 10B, while fiber 10D is directly adjacent only to fiber 10C. Fibers 10B and 10C are each disposed between two adjacent fibers, as can be seen in the cross-section of FIG. 2A. The outer or "edge" fibers of the linear-array are twisted at first and second twists, 22, 24, between which is a substantially straight, parallel section 26. Straight section 26 need not be perfectly straight, but will generally have considerably less rotational slope or "pitch" than the edge fibers at the adjacent twisted portions.

The individual optic fibers are fused together at least along a portion of the straight section 26. As was more fully explained in co-pending U.S. patent application Ser. No. 08/670,991, filed Jun. 28, 1996, the full disclosure of which is hereby incorporated by reference, each of the twist portions preferably defines one-half of one turn, so that the entire coupler defines a full twist of 360°. Generally, at least one of fibers 10A through 10D have been pre-pulled, that is, the fiber has been heated and elongated to change the diameter and propagation constant of that fiber relative to the other optical fibers of the linear-array. In some embodiments, two or more of the optical fibers will be pre-pulled so that propagation constants of the fibers vary across the linear-array, as illustrated in FIG. 2A.

As is described hereinbelow, the goal of pre-pulling the fibers is to provide varying coupling coefficients at each of the fused joints 28 across the linear-array. While pre-pulling of the individual fibers is the preferred mechanism to provide these differing coupling coefficients, those skilled in the art will recognize that doping of selective fibers, or some other propagation varying mechanism, could also be used to achieve this same result.

Figure 3A:
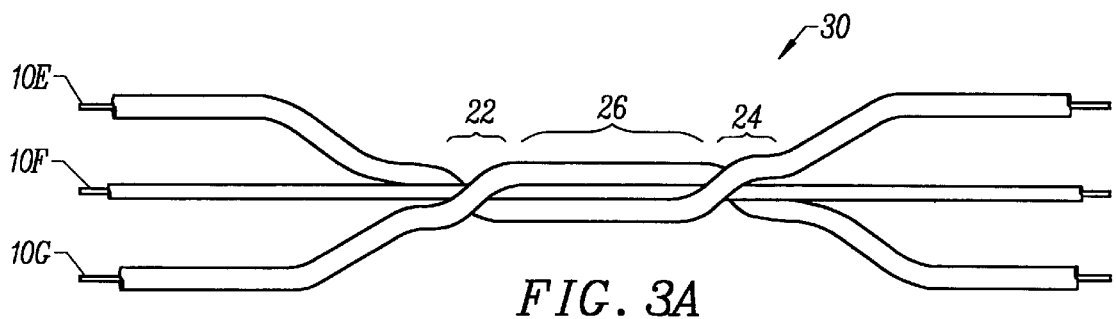
FIGS. 3 and 3A illustrate an optical coupler having three optic fibers arranged in a linear array, in which the center fiber has been pre-pulled to vary its propagation constant.
Figure 3B:
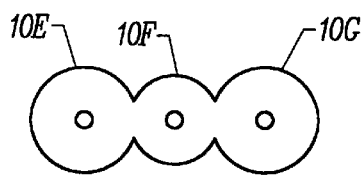

Referring now to FIGS. 3 and 3A, a three-fiber linear-array fiber optic coupler 30 comprises three optical fibers 10E through 10G, the fibers once again forming a first twist 22, a second twist 24, and a substantially straight section therebetween 26. At least one of the three fibers, 10E through 10G, has been pre-pulled prior to fusing the fibers together along at least a portion of the substantially straight section.

Figure 4:
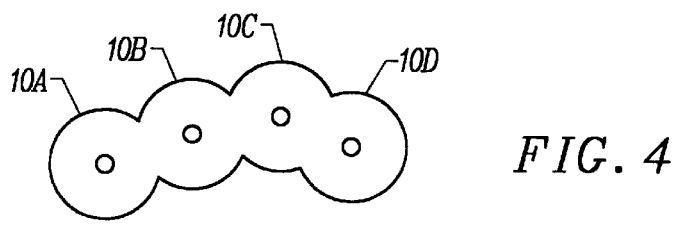
FIG. 4 illustrates a cross-section of a linear array fiber optic coupler, and illustrates that geometric distortions have a limited effect on the fused joints between the fibers of the array.

FIG. 4 helps to illustrate what is meant by the term "linear-array" as used in the present application, and also shows that distortions in the linear-array will have little effect on the performance of the present couplers. In the four fiber linear-array optic coupler cross-section of FIG. 4, the linear-array geometry has been distorted so that the edge fibers are not directly opposite each other. Additionally, the coupled region between fibers 10C and 10D is substantially larger than coupled regions between other fibers. Nonetheless, fibers 10A and 10D define edges of the linear-array, while inner fibers 10B and 10C are coupled only between two adjacent fibers. In other words, a line can be drawn on the section, beginning at the core of one edge fiber, which passes through the cores of each inner fiber, and which ends at the opposed edge fiber, but which does not substantially define an enclosed polygon. Hence, the coupler of FIG. 4 remains a linear-array. It should be understood that optic couplers of large numbers of fibers might be formed in part as a linear-array, and in part with a hexagonal or other bundled geometric structure between the edge fibers, within the scope of the present invention.

To understand the advantages of the linear-array optic fiber geometry, and to calculate the effects of pre-pulling selected fibers so as to provide a particular desired power-splitting coupler output, it is helpful to analyze the propagation of light through the combined wave guide along the coupled length of a simplified linear-array optic fiber coupler.

Linear-Array 3×3 Couplers of Uniform Fibers

Figure 5:
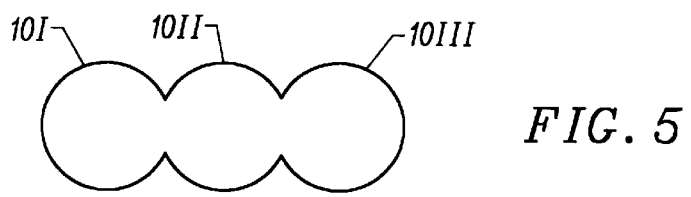
FIG. 5 illustrates a simplified cross-section of a fiber optic coupler having three uniform fibers, as used to model the theoretical performance of such structures hereinbelow.

To build up an analytical model of the preferred optic fiber coupler illustrated in FIGS. 2 and 2A, we will start with a simple linear-array optic fiber coupler having 3 uniform optic fibers 10I, 10II and 10III as illustrated in FIG. 5. The couplers of the present invention may provide 1×N of N×N coupling. We will first analyze the more constrained (and problematic) N×N output characteristics of these devices. Applying electric field amplitude formulae to our linear-array 3×3 coupler of identical fibers gives the following:

$$\begin{pmatrix} a_1(z) \\ a_2(z) \\ a_3(z) \end{pmatrix} =$$

$$\alpha \begin{bmatrix} \frac{1}{2}(\cos\sqrt{2}\ kz+1), & -\frac{j}{\sqrt{2}}\sin\sqrt{2}\ kz, & \frac{1}{2}(\cos\sqrt{2}\ kz-1) \\ -\frac{j}{\sqrt{2}}\sin\sqrt{2}\ kz, & \cos\sqrt{2}\ kz, & -\frac{j}{\sqrt{2}}\sin\sqrt{2}\ kz \\ \frac{1}{2}(\cos\sqrt{2}\ kz-1), & -\frac{j}{\sqrt{2}}\sin\sqrt{2}\ kz, & \frac{1}{2}(\cos\sqrt{2}\ kz+1) \end{bmatrix} \begin{pmatrix} a_1(0) \\ a_2(0) \\ a_3(0) \end{pmatrix}$$

Here, $a_i(z)$ (i=1, 2, 3) are the electric field amplitudes at the output side of optical fibers 10I, 10II, and 10III, respectively. Similarly, $a_i(0)$ (i=1, 2, 3) are the electric field amplitudes at the input side of fibers 10I–III. The loss coefficient of the coupler is represented by the factor α, which here accounts for real-world coupler imperfections.

The coupling coefficient between adjacent fibers is k. This coupling coefficient is assumed to be consistent across the fused joints of this linear-array. In other words, the coupling coefficient between fiber 10I and fiber 10II is the same as the coupling coefficient between fiber 10II and fibers 10I, and is also the same as the coupling coefficient between fibers 10II and 10III, etc. The axial length of the coupling region is z. j represents the imaginary part of a complex number (j=$\sqrt{-1}$).

Designating the light intensities from fibers 10I, 10II, and 10III at the output side of the coupler as $P_1(z)$, $P_2(z)$, and $P_3(z)$, respectively, and similarly designating the light intensities input into the input side of the coupler fibers 10I, 10II, and 10III as $P_1(0)$, $P_2(0)$, and $P_3(0)$, we first assume that a light signal is input only into the input end of the inner fiber 10II. Thus, the initial condition is $P_2(0)=1$ ($a_2(0)=1$) and $P_1(0)=P_3(0)=0$, and the output light intensities will be:

$$P_1(z) = \frac{1}{2}\alpha^2 \sin^2 \sqrt{2}\ kz$$

$$P_2(z) = \alpha^2 \cos^2 \sqrt{2}\ kz$$

$$P_3(z) = \frac{1}{2}\alpha^2 \sin^2 \sqrt{2}\ kz$$

Figure 5A:
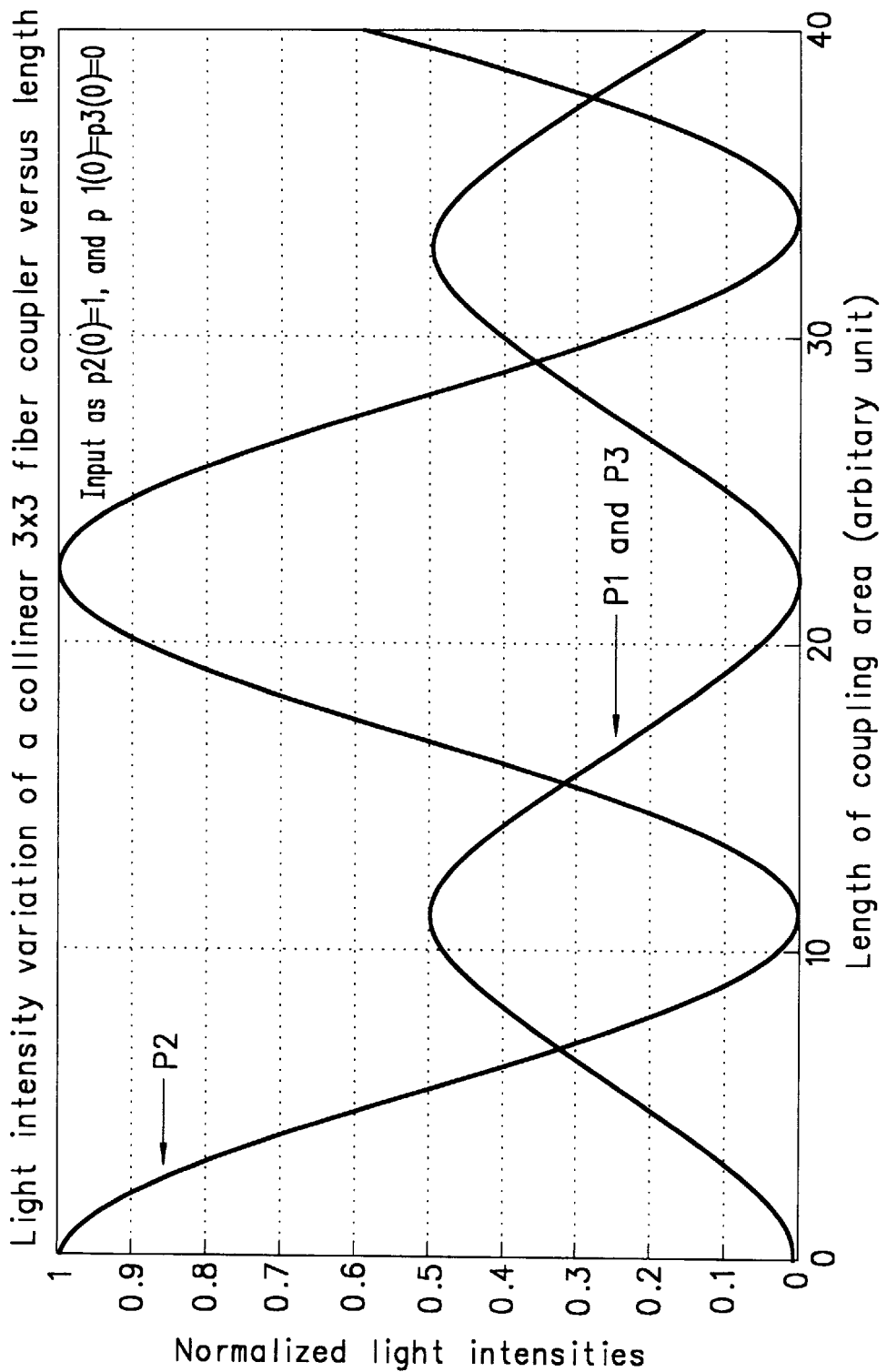
FIGS. 5A and B illustrate the variations in light intensity versus coupler length for a linear array fiber optic coupler having three uniform fibers with uniform coupling constants.

FIG. 5A is a graph of the normalized light intensities (also called the power splitting ratios) for variations in the coupling length z. If we instead assume the signal is input into the edge fiber 10I, the initial condition is $P_2(0)=P_3(0)=0$ and $P_1(0)=1$, and the output light intensities will be:

$$P_1(z) = \frac{1}{4}\alpha^2 (\cos\sqrt{2}\ kz+1)^2$$

$$P_2(z) = \frac{1}{2}\alpha^2 \sin^2 \sqrt{2}\ kz$$

$$P_3(z) = \frac{1}{4}\alpha^2 (\cos\sqrt{2}\ kz-1)^2$$

Figure 5B:
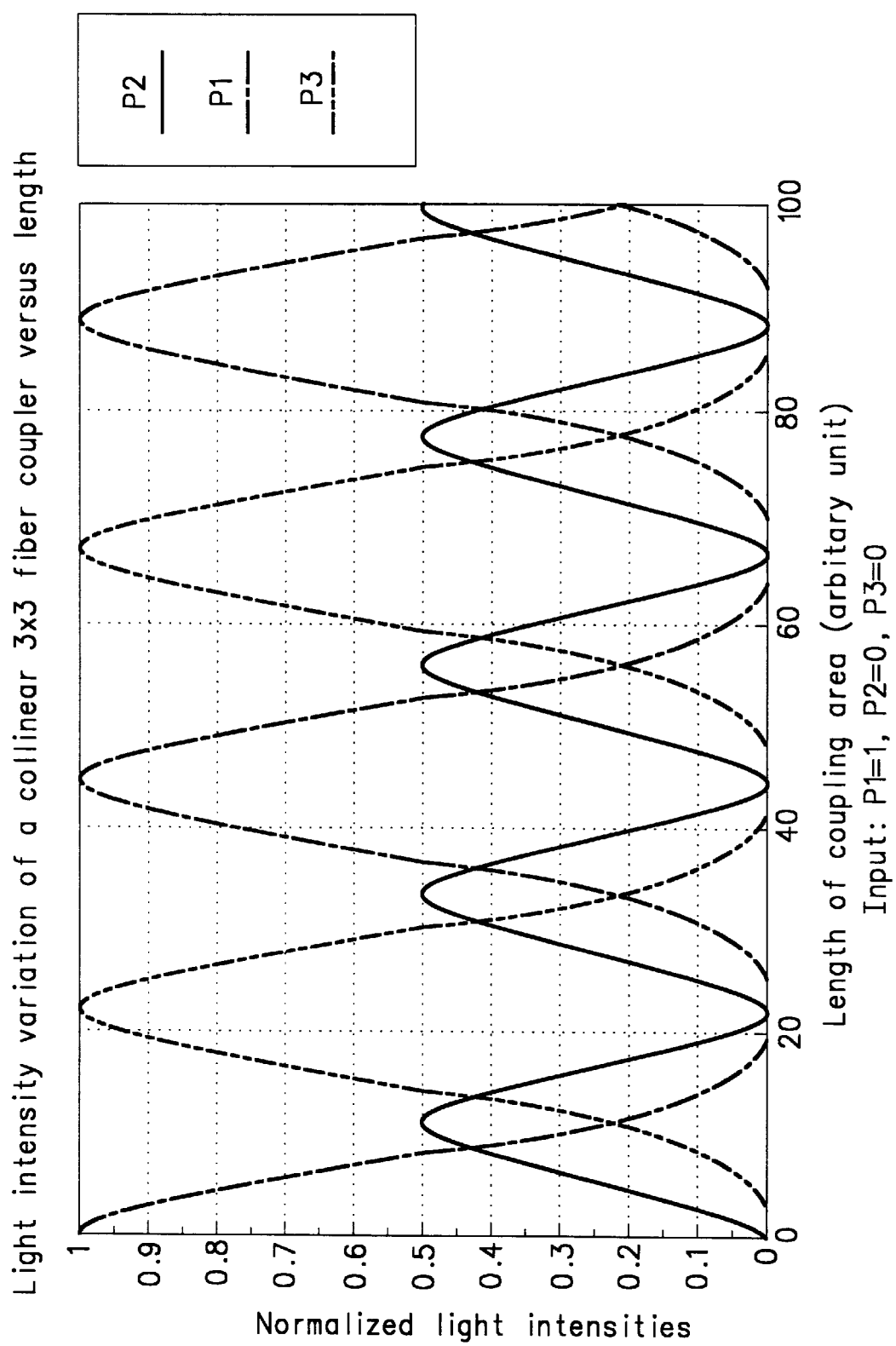

FIG. 5B illustrates the variation in light intensities versus coupled length at the output ends of the three fibers when light is input into an edge fiber. Thus, we can model the output characteristics of this uniform 3×3 coupler fairly directly.

The theoretical model appears to indicate that light input into certain fibers will never be evenly split at the output (see FIG. 5B). In reality, variations and imperfections in actual linear-array couplers may produce light intensities verses length characteristics which do not match these models precisely. Thus, gradually increasing the coupled length z (typically by heating the fibers and carefully pulling apart the input end and the output end while monitoring the light signal at the output end of each fiber) may eventually provide the desired even power distribution. Hence, real world imperfections may occasionally allow production of a uniform fiber 3×3 linear-array coupler. Nonetheless, the models indicate that repeatable and reliable production of such couplers will be problematic.

Linear-Array 4×3 Couplers of Uniform Fibers

Figure 6:
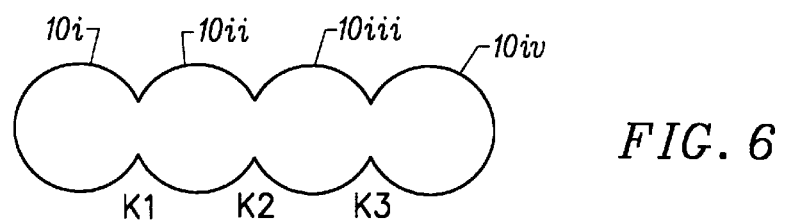
FIG. 6 illustrates a simplified cross-section of an fiber optic coupler having four fibers, as used to model the theoretical performance of such structures hereinbelow.

Turning now to a slightly more complex case, and numbering individual fibers as shown in FIG. 6, electric field amplitudes of a 4×4 linear-array fiber coupler with identical fibers will be:

$$\begin{bmatrix} a_1(z) \\ a_2(z) \\ a_3(z) \\ a_4(z) \end{bmatrix} = \begin{bmatrix} -\frac{a_2^2(a_1^2-1)}{\alpha}\cos(a_1 kz) + \frac{a_1^2(a_2^2-1)}{\alpha}\cos(a_2 kz) & j\left[\frac{a_1(a_2^2-1)}{\alpha}\sin(a_1 kz) + \frac{a_2(a_1^2-1)}{\alpha}\sin(a_2 kz)\right] & -\frac{1}{\alpha}\cos(a_1 kz) + \frac{1}{\alpha}\cos(a_2 kz) & j\left[\frac{a_1 a_1^2}{\alpha}\sin(a_1 kz) - \frac{a_2 a_1^2}{\alpha}\sin(a_2 kz)\right] \\ j\left[\frac{a_1(a_1^2-2)}{\alpha}\sin(a_1 kz) - \frac{a_2(a_1^2-2)}{\alpha}\sin(a_2 kz)\right] & \frac{a_1^2(a_2^2-1)}{\alpha}\cos(a_1 kz) - \frac{a_2^2(a_1^2-1)}{\alpha}\cos(a_2 kz) & j\left[\frac{a_1}{\alpha}\sin(a_2 kz) - \frac{a_2}{\alpha}\sin(a_2 kz)\right] & -\frac{1}{\alpha}\cos(a_1 kz) + \frac{1}{\alpha}\cos(a_2 kz) \\ -\frac{1}{\alpha}\cos(a_1 kz) + \frac{1}{\alpha}\cos(a_2 kz) & j\left[\frac{a_1}{\alpha}\sin(a_1 kz) - \frac{a_2}{\alpha}\sin(a_2 kz)\right] & \frac{a_2^2(a_2^2-1)}{\alpha}\cos(a_1 kz) - \frac{a_1^2(a_1^2-1)}{\alpha}\cos(a_2 kz) & j\left[-\frac{a_1(a_1^2-2)}{\alpha}\sin(a_1 kz) - \frac{a_2(a_2^2-2)}{\alpha}\sin(a_2 kz)\right] \\ j\left[\frac{a_1 a_2^2}{\alpha}\sin(a_1 kz) - \frac{a_2 a_1^2}{\alpha}\sin(a_2 kz)\right] & -\frac{1}{\alpha}\cos(a_1 kz) + \frac{1}{\alpha}\cos(a_2 kz) & j\left[-\frac{a_1(a_2^2-1)}{\alpha}\sin(a_1 kz) + \frac{a_2(a_1^2-1)}{\alpha}\sin(a_2 kz)\right] & -\frac{a_2^2(a_1^2-1)}{\alpha}\cos(a_1 kz) + \frac{a_1^2(a_2^2-1)}{\alpha}\cos(a_2 kz) \end{bmatrix} \begin{bmatrix} a_1(0) \\ a_2(0) \\ a_3(0) \\ a_4(0) \end{bmatrix}$$

Where $a_i(z)$ (i=1, 2, 3, 4) are the electric field amplitudes at the output side of fibers 10i, 10ii, 10iii, and 10iv, respectively, and $a_i(0)$ (i=1, 2, 3, 4) are the electric field amplitudes at the corresponding input sides. Excessive loss of the coupler is not considered, k is again the coupling coefficient of adjacent fibers, z is again the coupled length, and the following are constants:

$$\alpha_1 = \sqrt{\frac{3+\sqrt{5}}{2}}, \ \alpha_2 = \sqrt{\frac{3-\sqrt{5}}{2}}$$

and $$\alpha = \alpha_1^2(\alpha_2^2 - 1) - \alpha_2^2(\alpha_1^2 - 1) = -\sqrt{5}.$$

If light is introduced into edge fiber 10i, the initial condition is $P_1(0)=1$ (so that $a_1(0)=1$)) and $P_2(0)=P_3(0)=P_4(0)=0$ then the output light intensities are as follows:

$$P_1(z) = \frac{3-\sqrt{5}}{10}\cos^2\left(\sqrt{\frac{3+\sqrt{5}}{2}}\ kz\right) + \frac{3+\sqrt{5}}{10}\cos^2\left(\sqrt{\frac{3-\sqrt{5}}{2}}\ kz\right) +$$

$$\frac{2}{5}\cos\left(\sqrt{\frac{3+\sqrt{5}}{2}}\ kz\right)\cos\left(\sqrt{\frac{3-\sqrt{5}}{2}}\ kz\right)$$

$$P_2(z) = \frac{1}{5}\sin^2\left(\sqrt{\frac{3+\sqrt{5}}{2}}\ kz\right) + \frac{1}{5}\sin^2\left(\sqrt{\frac{3-\sqrt{5}}{2}}\ kz\right) +$$

$$\frac{2}{5}\sin\left(\sqrt{\frac{3+\sqrt{5}}{2}}\ kz\right)\sin\left(\sqrt{\frac{3-\sqrt{5}}{2}}\ kz\right)$$

$$P_3(z) = \frac{1}{5}\cos^2\left(\sqrt{\frac{3+\sqrt{5}}{2}}\ kz\right) + \frac{1}{5}\cos^2\left(\sqrt{\frac{3-\sqrt{5}}{2}}\ kz\right) -$$

$$\frac{2}{5}\cos\left(\sqrt{\frac{3+\sqrt{5}}{2}}\ kz\right)\cos\left(\sqrt{\frac{3-\sqrt{5}}{2}}\ kz\right)$$

$$P_4(z) = \frac{3-\sqrt{5}}{10}\sin^2\left(\sqrt{\frac{3+\sqrt{5}}{2}}\ kz\right) + \frac{3+\sqrt{5}}{10}\sin^2\left(\sqrt{\frac{3-\sqrt{5}}{2}}\ kz\right) -$$

$$\frac{2}{5}\sin\left(\sqrt{\frac{3+\sqrt{5}}{2}}\ kz\right)\sin\left(\sqrt{\frac{3-\sqrt{5}}{2}}\ kz\right)$$

Figure 6A:
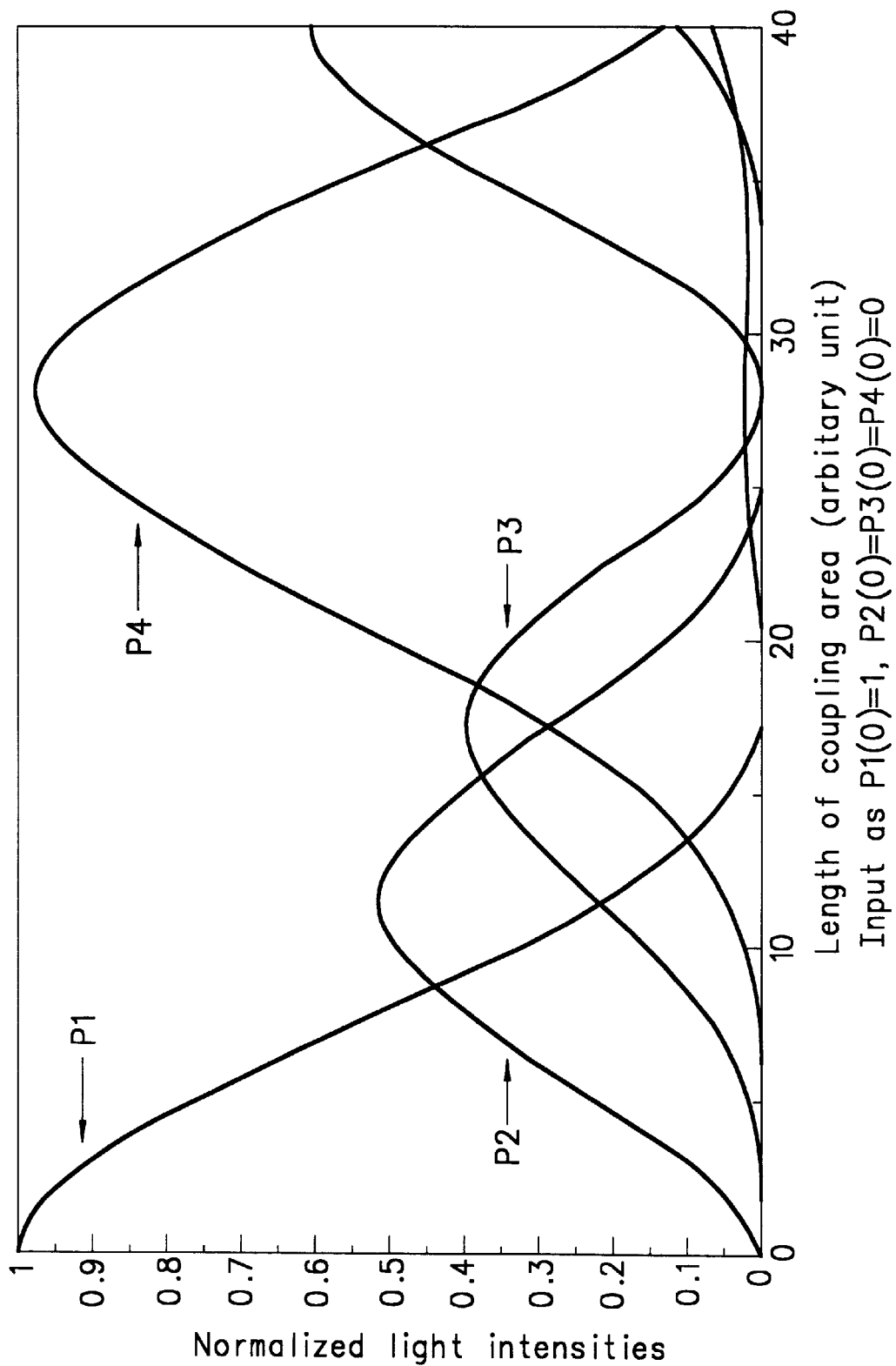
FIGS. 6A–C illustrate the variations in light intensity versus coupler length for a linear array fiber optic coupler having four uniform fibers with uniform coupling constants therebetween.
Figure 6B:
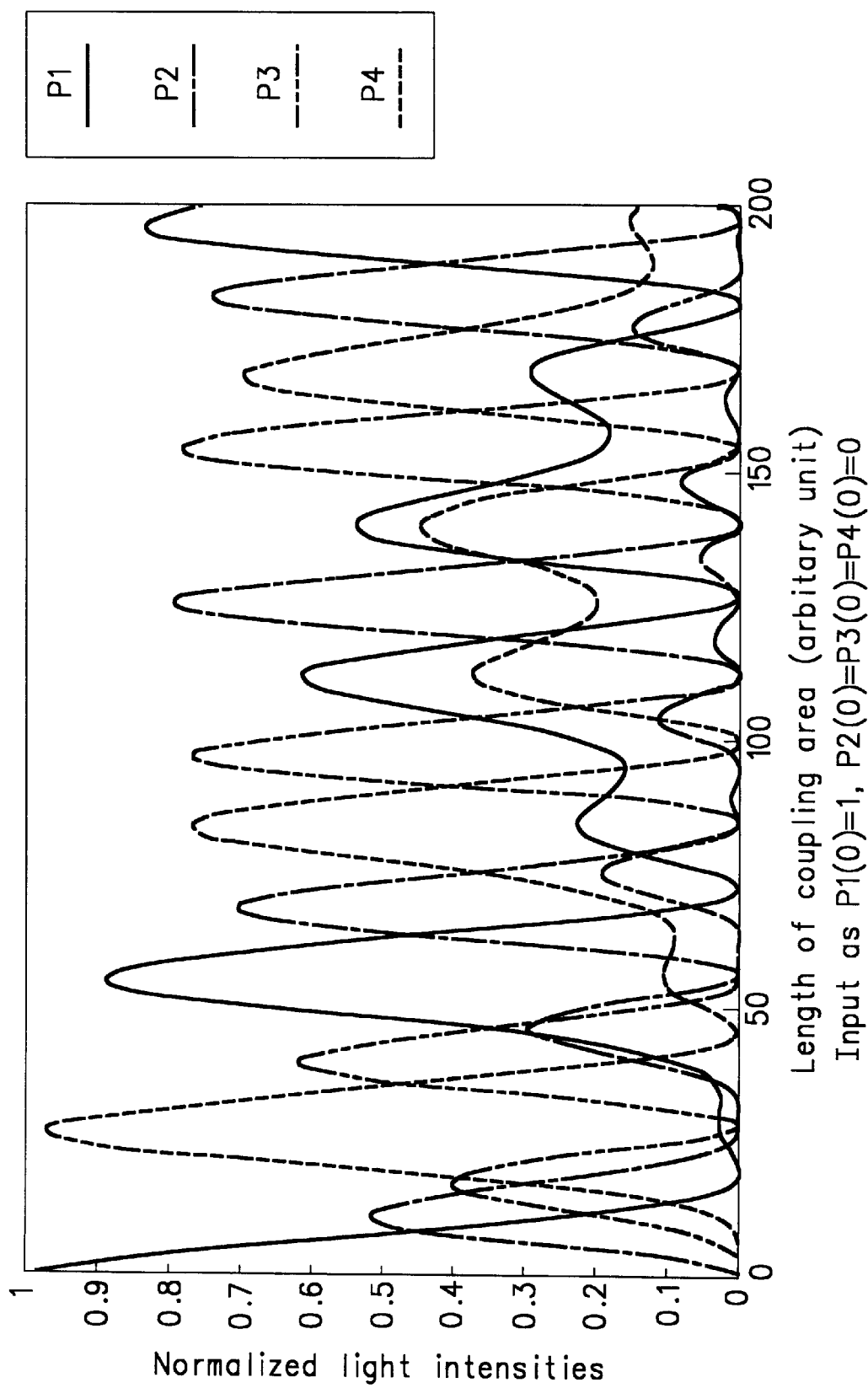

FIGS. 6A and 6B illustrate these light intensities for varying coupled lengths z. This should be representative of the power splitting which results when light enters an edge fiber.

If a light signal is introduced into one of the two inner fibers, we have that the initial condition is $P_1(0)=P_3(0)=P_4(0)=0$ and $P_2(0)=1$, and the output light intensities are:

$$P_1(z) = \frac{1}{5}\sin^2\left(\sqrt{\frac{3+\sqrt{5}}{2}}\ kz\right) + \frac{1}{5}\sin^2\left(\sqrt{\frac{3-\sqrt{5}}{2}}\ kz\right) +$$

$$\frac{2}{5}\sin\left(\sqrt{\frac{3+\sqrt{5}}{2}}\ kz\right)\sin\left(\sqrt{\frac{3-\sqrt{5}}{2}}\ kz\right)$$

$$P_2(z) = \frac{3+\sqrt{5}}{10}\cos^2\left(\sqrt{\frac{3+\sqrt{5}}{2}}\ kz\right) + \frac{3-\sqrt{5}}{10}\cos^2\left(\sqrt{\frac{3-\sqrt{5}}{2}}\ kz\right) +$$

-continued $$\frac{2}{5}\cos\left(\sqrt{\frac{3+\sqrt{5}}{2}}\ kz\right)\cos\left(\sqrt{\frac{3-\sqrt{5}}{2}}\ kz\right)$$

$$P_3(z) = \frac{3+\sqrt{5}}{10}\sin^2\left(\sqrt{\frac{3+\sqrt{5}}{2}}\ kz\right) + \frac{3-\sqrt{5}}{10}\sin^2\left(\sqrt{\frac{3-\sqrt{5}}{2}}\ kz\right) -$$

$$\frac{2}{5}\sin\left(\sqrt{\frac{3+\sqrt{5}}{2}}\ kz\right)\sin\left(\sqrt{\frac{3-\sqrt{5}}{2}}\ kz\right)$$

$$P_4(z) = \frac{1}{5}\cos^2\left(\sqrt{\frac{3+\sqrt{5}}{2}}\ kz\right) + \frac{1}{5}\cos^2\left(\sqrt{\frac{3-\sqrt{5}}{2}}\ kz\right) -$$

$$\frac{2}{5}\cos\left(\sqrt{\frac{3+\sqrt{5}}{2}}\ kz\right)\cos\left(\sqrt{\frac{3-\sqrt{5}}{2}}\ kz\right)$$

Figure 6C:
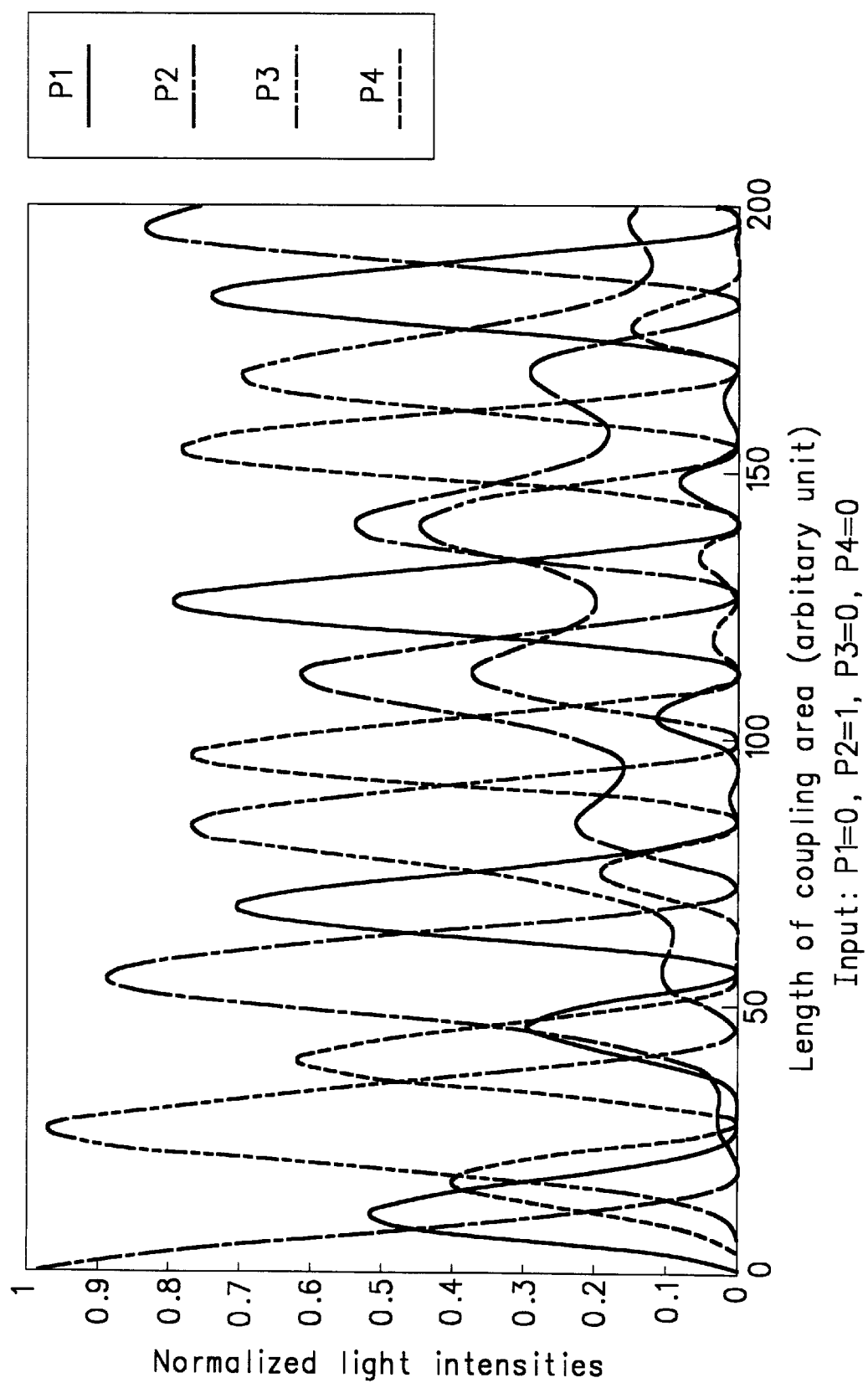

These output intensities are shown in FIG. 6C for varying coupled lengths, and the difficulty in relatively producing such 4×4 couplers with even power splitting can be understood with reference to that graph.

Linear-Array N×N Couplers of Uniform Fibers

Turning to the more general situation of an N×N linear-array fiber optic coupler, using fiber numbering similar to that described above, and again ignoring excessive loss, electric field amplitudes of these couplers with identical fibers will be:

$$a_i(z) = \sum_{m=1}^{n} A_{im} a_m(0) \quad i = 1, 2, 3, \ldots, n$$

$$or \begin{pmatrix} a_1(z) \\ a_2(z) \\ a_3(z) \\ \vdots \\ a_n(z) \end{pmatrix} = (A_{pq}) \begin{pmatrix} a_1(0) \\ a_2(0) \\ a_3(0) \\ \vdots \\ a_n(0) \end{pmatrix}$$

Here $A_{pq} = \frac{2}{n+1}\sum_{m=1}^{n}\sin\left(\frac{pm}{n+1}\pi\right)\sin\left(\frac{qm}{n+1}\pi\right)e^{\lambda_m z}$ and $\lambda_m = -2jK\cos\left(\frac{m}{n+1}\pi\right)$, $p, q = 1, 2, \ldots, n$ Where $a_i(z)$, i=1, 2, ..., n are the electric field amplitudes in fibers 1, 2, 3, ..., n at the output side, and $a_i(0)$, i=1, 2, ..., n are the electric field amplitudes in fibers 1, 2, 3, ..., n at the input side. $A_{im}$, i, m=1, 2, ..., n are elements of matrix A, a transfer matrix of electric field amplitudes, and $\lambda_m$, m=1, 2, ..., n are eigenvalues of a characteristic matrix of the coupled mode equation set. As above, z is the coupling length of the coupler.

K is the coupling coefficient of adjacent fibers, and we again assume that all such coupling coefficients are equal and are real values. In other words, $K=k_{12}=k_{21}=k_{23}=k_{32}=\ldots=k_{n-1,n}=k_{n,n-1}$. $P_i(z)$, i=1, 2, ..., n are light intensities in fiber 1, 2, ..., n at the output of the coupler, and $P_i(0)$, i=1, 2, ..., n: are light intensities of fiber 1, 2, ..., n at the input side of the coupler. In general, light intensities of such an N×N fiber couplers at the output side will be (i=1, 2, 3, . . . , n):

$$P_i(z) = \frac{4}{(n+1)^2}$$
$$\sum_{m,q,s,t=1}^{n} \sin\left(\frac{is\pi}{n+1}\right)\sin\left(\frac{ms\pi}{n+1}\right)\sin\left(\frac{it\pi}{n+1}\right)\sin\left(\frac{qt\pi}{n+1}\right)e^{(\lambda_s+\lambda_t^*)z} \cdot \sqrt{P_q(0)P_m(0)}$$

Bandwidth of Linear-Array Fiber Couplers

The above analysis assumes that all fibers in the linear-array fiber coupler are identical, and that all coupling coefficients between adjacent fibers are equal. These assumptions greatly simplify the formula derivations, but as was indicated regarding even the relatively simple 3×3 case, some properties of the linear-array fiber couplers need more sophisticated equations to explain. Those properties include bandwidth effects, equal power splitting between the fibers of 4×4 couplers, and many other important characteristics.

In practical terms, it is very difficult to find a coupling length at which the four output ports of a 4×3 coupler with identical fibers and identical coupling coefficients have identical light intensities. To provide such couplers, we need to provide some additional mechanism to vary the light propagation characteristics across the linear-array, that is, to control the lateral light coupling from each fiber to the next.

The coupling coefficient between fused fibers has the form of:

$$K_{\mu\nu} = \frac{\omega\epsilon_0}{4jP}\int_{-\infty}^{\infty}\int_{-\infty}^{\infty}(n^2 - n_0^2)E_{\mu t}^* \cdot E_{\nu t} dx dy$$

or $$K_{\mu\nu} = \frac{1}{\lambda} \cdot \frac{2\pi c\epsilon_0}{4jP}\int_{-\infty}^{\infty}\int_{-\infty}^{\infty}(n^2 - n_0^2)E_{\mu t}^* \cdot E_{\nu t} dx dy$$

or
Where $K_{\mu\nu}$ is the coupling coefficient between the $\mu$the and vth mode of the transverse electric field in the fibers. $\omega$ is the angular frequency of the light propagation in the fibers. $\epsilon_0$ is the permittivity of vacuum, and P is a light intensity normalization factor. The equivalent refractive indexes of the fiber cores before and after the coupling perturbation are n, and $n_0$, while $E_{\mu t}$ and $E_{\nu t}$ are the transverse electric field amplitudes of the eigenmodes in the fiber cores. $\lambda$ is the wavelength of the light propagating in the fiber.

It can be seen that the integral portion of the above equation has a relatively weak dependence on wavelength, so that the overall wavelength dependence of the coupling coefficient is approximately proportional to the inverse of the wavelength. Therefore, we can assume the coupling coefficient will be of the form $K_{\mu\nu}=C/\lambda$, C being a constant.

From inspection of the 3×3 coupler formulae given above, we can see that when $\sqrt{2}$ Kz is equal to some value, say a, then all three output ports will have equal light intensities. If we denote that $$\sqrt{2}\,Kz = a, \text{ then } \lambda = \frac{\sqrt{2}\,C_z}{a}.$$

Figure 7A:
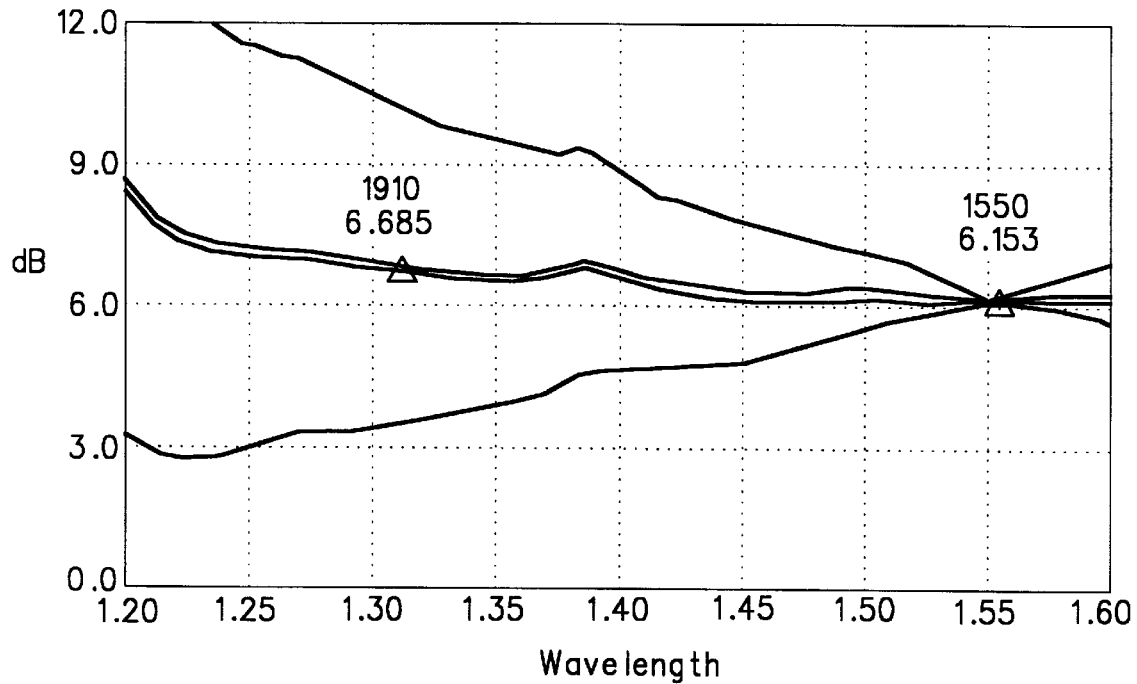
FIGS. 7A and B illustrate the wavelength and insertion loss characteristics of couplers having four uniform optic fibers in the bundled configuration of FIG. 1B, and in the linear-array configuration of FIGS. 2 and 2A, respectively.
Figure 7B:
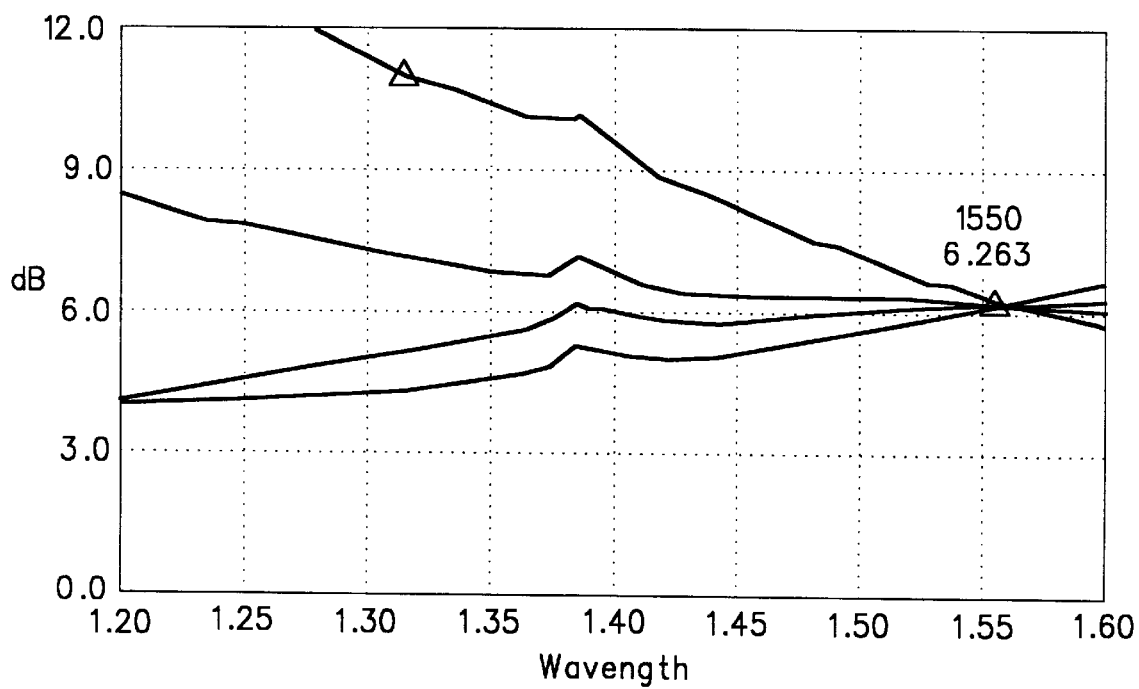

This indicates that even when a uniform fiber linear-array 3×3 coupler is successfully fabricated, only one wavelength will accurately satisfy the conditions required to have three output ports with identical light intensities. Hence, this explains why couplers with identical fibers have a narrow bandwidth. This sensitivity to signal wavelength is not limited to 3×3 linear-array couplers, but is instead generally found in couplers having uniform fibers. FIG. 7A shows the variations in insertion loss at different wavelengths for a 4×4 linear-array fiber optic coupler having uniform fibers, while FIG. 7B is a similar graph for a 4×4 bundled fiber optic coupler having uniform fibers and a geometry similar to that shown in FIG. 1B.

To achieve wideband coupling, it would be helpful to make use of length dependent coupling techniques. In other words, if K is a function of both $\lambda$ and z, it is possible that the coupler will provide more wideband coupling characteristics. One approach to vary the coupling coefficient with changes in the coupled length is to alternate pre-stretched fibers with unstretched fibers across the array. The variations of coupling coefficient with the length should be reliable and predictable, so that the combined waveguide can be accurately heated and pulled to provide the desired fiber output characteristics.

As described above, one characteristic of the side-by-side geometry of the linear-array couplers of the present invention is that each edge fiber is coupled only to one middle fiber throughout the parallel portion of the coupler, while each inner fiber is coupled directly between only two adjacent fibers. As was also described above, the couplers of the present invention are preferably formed by heating and pulling a substantially parallel coupled portion disposed between two twists. These features and methods help to provide uniform fiber—fiber fusing laterally across the linear-array, regardless of any minor distortions or deviations in the nominal array geometry (as shown and described with reference to FIG. 4).

Additionally, the structure of the couplers shown in FIGS. 2 and 3 will also minimize mechanical stress-induced variations in the fiber—fiber joint when the parallel portion 26 is elongated to provide the desired power splitting characteristics. In other words, the mechanical fiber—fiber fusing characteristics of the present linear-array, twist/parallel/twist couplers will be unusually uniform across the linear-array, and will also be relatively insensitive to variations in coupled length. Hence, when these couplers are formed with uniform fibers, the coupling coefficients will be fairly independent of the coupled length. Surprisingly, as these couplers are uniform and reliable in their fusing properties, they are also particularly well adapted to take advantage of a separate mechanism—pre-pulling of selected fibers—to provide a reliable and repeatable variation of coupling co-efficient when the parallel portion is heated and pulled to vary the coupling length.

To facilitate reliable and repeatable production of a wideband coupler, it will be helpful to analytically calculate the coupler's power splitting properties when non-uniform fibers are included.

4×4 or 1×4 Linear-Array Fiber Couplers with Unequal Coupling Coefficients

The following calculations are based on the coupler shown in FIG. 6, in which the coupling coefficients K1, K2, and K3 may vary across the linear-array. The general coupled-mode equations are:

$$\frac{d a_1(z)}{dz} = -jk_1 a_2(z)$$

$$\frac{d a_2(z)}{dz} = -jk_1 a_1(z) - jk_2 a_3(z)$$

$$\frac{d a_3(z)}{dz} = -jk_2 a_2(z) - jk_3 a_4(z)$$

$$\frac{d a_4(z)}{dz} = -jk_3 a_3(z)$$

To solve the above equations, we need to solve the following eigenvector problem:

$$\begin{pmatrix} 0 & -jk_1 & 0 & 0 \\ -jk & 0 & -jk_2 & 0 \\ 0 & -jk_2 & 0 & -jk_3 \\ 0 & 0 & -jk_3 & 0 \end{pmatrix} V = \lambda V$$

which leads to $$\det \begin{pmatrix} -\lambda & -jk_1 & 0 & 0 \\ -jk_1 & -\lambda & -jk_2 & 0 \\ 0 & -jk_2 & -\lambda & -jk_3 \\ 0 & 0 & -jk_3 & -\lambda \end{pmatrix} = 0$$

which is the same as: $\lambda^4 + (K_1^2 + K_2^2 + K_3^2)\lambda^2 + K_1^2 K_3^2 = 0$.

If we denote $C_1 = K_1^2 + K_2^2 + K_3^2$, and $C_2 = K_1^2 K_3^2$, then the solution of the above equation is:

$$\lambda_1 = j \sqrt{\frac{C_1 + \sqrt{C_1^2 - 4C_2}}{2}}$$

$$\lambda_2 = -\lambda_1$$

$$\lambda_3 = j \sqrt{\frac{C_1 + \sqrt{C_1^2 - 4C_2}}{2}}$$

$$\lambda_4 = -\lambda_3$$

The solution of the coupled-mode equation will have the following form:

$$\begin{pmatrix} a_1(z) \\ a_2(z) \\ a_3(z) \\ a_4(z) \end{pmatrix} = \begin{pmatrix} a_{11} & a_{21} & a_{31} & a_{41} \\ a_{12} & a_{22} & a_{32} & a_{42} \\ a_{13} & a_{23} & a_{33} & a_{43} \\ a_{14} & a_{24} & a_{34} & a_{44} \end{pmatrix} \begin{pmatrix} \alpha_1 e^{\lambda_1 z} \\ \alpha_2 e^{\lambda_2 z} \\ \alpha_3 e^{\lambda_3 z} \\ \alpha_4 e^{\lambda_4 z} \end{pmatrix} = (A) \begin{pmatrix} \alpha_1 e^{\lambda_1 z} \\ \alpha_2 e^{\lambda_2 z} \\ \alpha_3 e^{\lambda_3 z} \\ \alpha_4 e^{\lambda_4 z} \end{pmatrix}$$

where $\alpha_1$, $\alpha_2$, $\alpha_3$, and $\alpha_4$ are constants which will be determined by the initial conditions, and $$a_{i1} = 1$$

$$a_{i2} = j \frac{\lambda_i}{k_1}$$

$$a_{i3} = -\frac{\lambda_i^2}{k_1 k_2} - \frac{k_1}{k_2}$$

$$a_{i4} = j \left[ \frac{\lambda_i k_3}{k_1 k_2} + \frac{k_1 k_3}{\lambda_i k_2} \right]$$

We have that:

$$\begin{pmatrix} a_1(0) \\ a_2(0) \\ a_3(0) \\ a_4(0) \end{pmatrix} = (A) \begin{pmatrix} \alpha_1 \\ \alpha_2 \\ \alpha_3 \\ \alpha_4 \end{pmatrix}$$

Giving us the following:

$$\begin{pmatrix} \alpha_1 \\ \alpha_2 \\ \alpha_3 \\ \alpha_4 \end{pmatrix} = (A^{-1}) \begin{pmatrix} a_1(0) \\ a_2(0) \\ a_3(0) \\ a_4(0) \end{pmatrix}$$

Therefore, we have that:

$$\begin{pmatrix} a_1(z) \\ a_2(z) \\ a_3(z) \\ a_4(z) \end{pmatrix} = (A) \begin{pmatrix} \alpha_1 e^{\lambda_1 z} \\ \alpha_2 e^{\lambda_2 z} \\ \alpha_3 e^{\lambda_3 z} \\ \alpha_4 e^{\lambda_4 z} \end{pmatrix}$$

$$= (A) \begin{pmatrix} e^{\lambda_1 z} & 0 & 0 & 0 \\ 0 & e^{\lambda_2 z} & 0 & 0 \\ 0 & 0 & e^{\lambda_3 z} & 0 \\ 0 & 0 & 0 & e^{\lambda_4 z} \end{pmatrix} \begin{pmatrix} \alpha_1 \\ \alpha_2 \\ \alpha_3 \\ \alpha_4 \end{pmatrix}$$

$$= (A) \begin{pmatrix} e^{\lambda_1 z} & 0 & 0 & 0 \\ 0 & e^{\lambda_2 z} & 0 & 0 \\ 0 & 0 & e^{\lambda_3 z} & 0 \\ 0 & 0 & 0 & e^{\lambda_4 z} \end{pmatrix} (A^{-1}) \begin{pmatrix} a_1(0) \\ a_2(0) \\ a_3(0) \\ a_4(0) \end{pmatrix}$$

$$= (P) \begin{pmatrix} a_1(0) \\ a_2(0) \\ a_3(0) \\ a_4(0) \end{pmatrix}$$

So that, in the 4×4 light intensity matrix P, $P_{ij}$ can be expressed as follows:

$$A^{-1} = \begin{pmatrix} \frac{1}{2} \frac{k_1^2 + \lambda_3^2}{\lambda_3^2 - \lambda_1^2}, & -\frac{j}{2} \frac{k_3 \lambda_3 - k_1 \lambda_1}{\lambda_3^2 - \lambda_1^2}, & \frac{1}{2} \frac{k_1 k_2}{\lambda_3^2 - \lambda_1^2}, & +\frac{j}{2} \frac{k_2 \lambda_3}{\lambda_3^2 - \lambda_1^2} \\ \frac{1}{2} \frac{k_1^2 + \lambda_3^2}{\lambda_3^2 - \lambda_1^2}, & -\frac{j}{2} \frac{k_1 \lambda_1 - k_1 \lambda_3}{\lambda_3^2 - \lambda_1^2}, & \frac{1}{2} \frac{k_1 k_2}{\lambda_3^2 - \lambda_1^2}, & -\frac{j}{2} \frac{k_2 \lambda_3}{\lambda_3^2 - \lambda_1^2} \\ -\frac{1}{2} \frac{\lambda_1^2 + k_1^2}{\lambda_3^2 - \lambda_1^2}, & +\frac{j}{2} \frac{\lambda_1 k_3 - k_1 \lambda_3}{\lambda_3^2 - \lambda_1^2}, & -\frac{1}{2} \frac{k_1 k_2}{\lambda_3^2 - \lambda_1^2}, & -\frac{j}{2} \frac{\lambda_1 k_2}{\lambda_3^2 - \lambda_1^2} \\ -\frac{1}{2} \frac{\lambda_1^2 + k_1^2}{\lambda_3^2 - \lambda_1^2}, & -\frac{j}{2} \frac{\lambda_1 k_3 - k_1 \lambda_3}{\lambda_3^2 - \lambda_1^2}, & -\frac{1}{2} \frac{k_1 k_2}{\lambda_3^2 - \lambda_1^2}, & +\frac{j}{2} \frac{\lambda_1 k_2}{\lambda_3^2 - \lambda_1^2} \end{pmatrix}$$

-continued $$P11 = \frac{\lambda_3^2 + k_1^2}{\lambda_3^2 - \lambda_1^2}\cos(-j\lambda_1 z) - \frac{\lambda_1^2 + k_1^2}{\lambda_3^2 - \lambda_1^2}\cos(-j\lambda_3 z)$$

$$P12 = \frac{k_1}{\lambda_1}\frac{k_3^2 + 2\lambda_3^2 - \lambda_1^2}{\lambda_3^2 - \lambda_1^2}\sin(-j\lambda_1 z) + \frac{\lambda_1 k_3 - k_1 \lambda_3}{\lambda_3^2 - \lambda_1^2}\sin(-j\lambda_3 z)$$

$$P13 = \frac{k_1 k_2}{\lambda_3^2 - \lambda_1^2}\cos(-j\lambda_1 z) - \frac{k_1 k_2}{\lambda_3^2 - \lambda_1^2}\cos(-j\lambda_3 z)$$

$$P14 = \frac{k_2 \lambda_3}{\lambda_3^2 - \lambda_1^2}\sin(-j\lambda_1 z) - \frac{k_2 \lambda_1}{\lambda_3^2 - \lambda_1^2}\sin(-j\lambda_3 z)$$

$$P21 = -\frac{\lambda_1}{k_1}\frac{\lambda_3^2 + K_3^2}{\lambda_3^2 - \lambda_1^2}\sin(-j\lambda_1 z) + \frac{\lambda_3}{k_1}\frac{\lambda_1^2 + k_1^2}{\lambda_3^2 - \lambda_1^2}\sin(-j\lambda_3 z)$$

$$P22 = \frac{k_3^2 + 2\lambda_3^2 - \lambda_1^2}{\lambda_3^2 - \lambda_1^2}\cos(-j\lambda_1 z) + \frac{\lambda_3}{k_1}\frac{\lambda_1 k_3 - k_1 \lambda_3}{\lambda_3^2 - \lambda_1^2}\cos(-j\lambda_3 z)$$

$$P23 = -\frac{\lambda_1 k_2}{\lambda_3^2 - \lambda_1^2}\sin(-j\lambda_1 z) + \frac{k_2 \lambda_3}{\lambda_3^2 - \lambda_1^2}\sin(-j\lambda_3 z)$$

$$P24 = -\frac{k_2 k_3}{\lambda_3^2 - \lambda_1^2}\cos(-j\lambda_1 z) + \frac{k_2 k_3}{\lambda_3^2 - \lambda_1^2}\cos(-j\lambda_3 z)$$

$$P31 = -\frac{(\lambda_1^2 + k_1^2)(\lambda_3^2 + k_1^2)}{k_1 k_2(\lambda_3^2 - \lambda_1^2)}\cos(-j\lambda_1 z) + \frac{(\lambda_1^2 + k_1^2)(\lambda_3^2 + k_1^2)}{k_1 k_2(\lambda_3^2 - \lambda_1^2)}\cos(-j\lambda_3 z)$$

$$P32 =$$
$$-\frac{\lambda_1^2 + k_1^2}{\lambda_1 k_2} \cdot \frac{k_3^2 + 2\lambda_3^2 - \lambda_1^2}{\lambda_3^2 - \lambda_1^2}\sin(-j\lambda_1 z) - \frac{(k_1^2 + \lambda_3^2)(\lambda_1 k_3 - k_1 \lambda_3)}{k_1 k_2(\lambda_3^2 - \lambda_1^2)}\sin(-j\lambda_3 z)$$

$$P33 = -\frac{\lambda_1^2 + k_1^2}{\lambda_3^2 - \lambda_1^2}\cos(-j\lambda_1 z) + \frac{k_1^2 + \lambda_3^2}{\lambda_3^2 - \lambda_1^2}\cos(-j\lambda_3 z)$$

$$P34 = -\frac{k_1 \lambda_3 - \lambda_1 k_3}{\lambda_3^2 - \lambda_1^2}\sin(-j\lambda_1 z) + \frac{\lambda_1 k_1 - \lambda_3 k_3}{\lambda_3^2 - \lambda_1^2}\sin(-j\lambda_3 z)$$

$$P41 =$$
$$-\frac{(\lambda_1 k_3 - k_1 \lambda_3)(k_1^2 + \lambda_3^2)}{k_1 k_2(\lambda_3^2 - \lambda_1^2)}\sin(-j\lambda_1 z) + \frac{(\lambda_3 k_3 - \lambda_1 k_1)(\lambda_1^2 + k_1^2)}{k_1 k_2(\lambda_3^2 - \lambda_1^2)}\sin(-j\lambda_3 z)$$

$$P42 = +\frac{(\lambda_1 k_3 - \lambda_3 k_1)(k_3^2 + 2\lambda_3^2 - \lambda_1^2)}{\lambda_1 k_2(\lambda_3^2 - \lambda_1^2)}\cos(-j\lambda_1 z) +$$
$$\frac{(\lambda_1 k_3 - \lambda_3 k_1)(\lambda_1 k_3 - k_1 \lambda_3)}{k_1 k_2(\lambda_3^2 - \lambda_1^2)}\cos(-j\lambda_3 z)$$

$$P43 = -\frac{\lambda_1 k_3 - k_1 \lambda_3}{\lambda_3^2 - \lambda_1^2}\sin(-j\lambda_1 z) + \frac{k_3 \lambda_3 - \lambda_1 k_1}{\lambda_3^2 - \lambda_1^2}\sin(-j\lambda_3 z)$$

$$P44 = \frac{k_3^2 + \lambda_3^2}{\lambda_3^2 - \lambda_1^2}\cos(-j\lambda_1 z) - \frac{k_3^2 + \lambda_1^2}{\lambda_3^2 - \lambda_1^2}\cos(-j\lambda_3 z)$$

Assuming light is input into the input end of the first fiber, and denoting:

$$\lambda_1 = j\sqrt{\frac{c_1 + \sqrt{c_1^2 - 4c_2}}{2}} = j\Lambda_1,$$

$$\lambda_3 = j\sqrt{\frac{c_1 + \sqrt{c_1^2 - 4c_2}}{2}} = j\Lambda_3$$

then output light intensity is as follows:

$$I_1 = P_{11} \cdot P_{11}^* = \left(\frac{K_1^2 - \Lambda_3^2}{\Lambda_1^2 - \Lambda_3^2}\cos(\Lambda_1 z) - \frac{k_1^2 - \Lambda_1^2}{\Lambda_1^2 - \Lambda_3^2}\cos(\Lambda_3 z)\right)^2$$

$$I_2 = P_{21}^* \cdot P_{21}$$
$$= \left(-\frac{\Lambda_1}{K_1} \cdot \frac{K_1^2 - \Lambda_3^2}{\Lambda_1^2 - \Lambda_3^2}\sin(\Lambda_1 z) + \frac{\Lambda_3}{K_1} \cdot \frac{K_1^2 - \Lambda_1^2}{\Lambda_1^2 - \Lambda_3^2}\sin(\Lambda_3 z)\right)^2$$

$$I_3 = P_{31}^* P_{31}$$
$$= \left(-\frac{(K_1^2 - \Lambda_1^2)(K_1^2 - \Lambda_3^2)}{K_1 K_2(\Lambda_1^2 - \Lambda_3^2)}\cos(\Lambda_1 z) + \right.$$
$$\left.\frac{(K_1^2 - \Lambda_1^2)(K_1^2 - \Lambda_3^2)}{K_1 K_2(\Lambda_1^2 - \Lambda_3^2)}\cos(\Lambda_3 z)\right)$$

$$I_4 = P_{41}^* P_{41}$$
$$= \left(-\frac{(\Lambda_1 K_3 - K_1 \Lambda_3)(K_1^2 - \Lambda_3^2)}{K_1 K_2(\Lambda_1^2 - \Lambda_3^2)}\sin(\Lambda_1 z) + \right.$$
$$\left.\frac{(\Lambda_3 K_3 - \Lambda_1 K_1)(K_1^2 - \Lambda_1^2)}{K_1 K_2(\Lambda_1^2 - \Lambda_3^2)}\sin(\Lambda_3 z)\right)^2$$

From the above equations, we can calculate the output light intensities at each of the fibers. Numerically, it has been found that when $K_1=0.108$, $K_2=0.1722$, $K_3=0.1756$, and $Z=11.4208$, then
$I_1 \approx I_2 \approx I_3 \approx I_4 = 25\%$.

Figure 8:
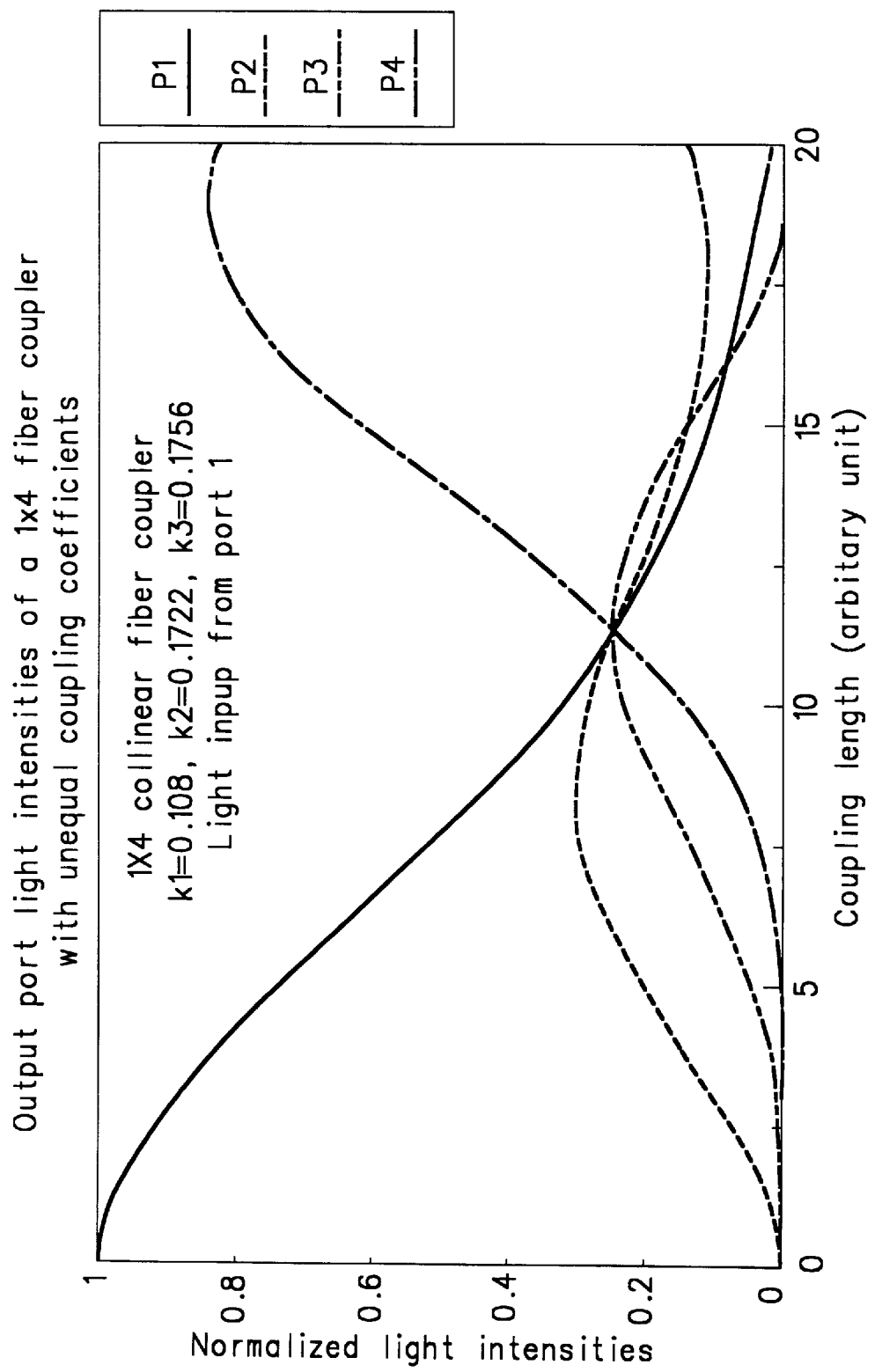
FIG. 8 illustrates the variations in light intensity versus coupler length for a linear-array 1×4 fiber optic coupler having fibers which have been selectively pre-pulled to vary the coupling constants of the fused joints between fibers.

FIG. 8 illustrates that these output light intensities as a function of the coupling length z, showing that this particular arrangement provides a substantially even power split. It should be understood that the absolute values of these particular coupling coefficients are not as important as the ratio between them, for example, $K_1/K_2$ and $K_1/K_3$.

The above calculation indicate that for 4×4 linear-array fiber couplers with unequal coupling coefficients, if a light signal is input at fiber 1, the output light intensities $I_{1-4}$ of fibers 10*i–iv* can generally be expressed as follows:

$$I_1 = \left(\frac{K_1^2 - \Lambda_3^2}{\Lambda_1^2 - \Lambda_3^2}\cos(\Lambda_1 Z) - \frac{K_1^2 - \Lambda_1^2}{\Lambda_1^2 - \Lambda_3^2}\cos(\Lambda_3 Z)\right)^2$$

$$I_2 = \left(-\frac{\Lambda_1}{K_1} \cdot \frac{K_1^2 - \Lambda_3^2}{\Lambda_1^2 - \Lambda_3^2}\sin(\Lambda_1 Z) + \frac{\Lambda_3}{K_1} \cdot \frac{K_1^2 - \Lambda_1^2}{\Lambda_1^2 - \Lambda_3^2}\sin(\Lambda_3 Z)\right)^2$$

$$I_3 = \left(-\frac{(K_1^2 - \Lambda_1^2)(K_1^2 - \Lambda_3^2)}{K_1 K_2(\Lambda_1^2 - \Lambda_3^2)}\cos(\Lambda_1 Z) + \frac{(K_1^2 - \Lambda_1^2)(K_1^2 - \Lambda_3^2)}{K_1 K_2(\Lambda_1^2 - \Lambda_3^2)}\cos(\Lambda_3 Z)\right)^2$$

$$I_4 = \left(-\frac{(\Lambda_1 K_3 - K_1 \Lambda_3)(K_1^2 - \Lambda_3^2)}{K_1 K_2(\Lambda_1^2 - \Lambda_3^2)}\sin(\Lambda_1 Z) + \right.$$
$$\left.\frac{(\Lambda_3 K_3 - \Lambda_1 K_1)(K_1^2 - \Lambda_1^2)}{K_1 K_2(\Lambda_1^2 - \Lambda_3^2)}\sin(\Lambda_3 Z)\right)^2$$

If we want equal output light intensities, we might set $I_1=I_2$, $I_2=I_3$, and $I_3=I_4$, or the like. However, in trying to solve this set of three equations, we find that we get a relation between $K_1$, $K_2$, $K_3$ and Z, as there are four variables here. The relationship can be stated in the form $K_1=f_1(z)$, $K_2=f_2(z)$, and $K_3=f_3(z)$.

Alternatively, it we look at form of the multiplying factors which appear in front of each sine or cosine function, we find that all of these multiplying factors are functions of the form $$f\left(\frac{K_2}{K_1}, \frac{K_3}{K_1}\right).$$

Hence, we can derive an expression such as:

$$\cos(\Lambda_1 z) = F\left(\frac{K_2}{K_1}, \frac{K_3}{K_1}\right)$$

$$\text{or } \Lambda_1 Z = G\left(\frac{K_2}{K_1}, \frac{K_3}{K_1}\right)$$

wherein $\Lambda_1$ can be expressed as $$K_1\sqrt{\frac{c_1 + \sqrt{c_1^2 - 4c_2}}{2K_1^2}} = K_1 f\left(\frac{K_2}{K_1}, \frac{K_3}{K_1}\right)$$

therefore $z = \frac{1}{K_1} F\left(\frac{K_2}{K_1}, \frac{K_3}{K_1}\right)$, and $K_1, K_2, K_3$ are coupling coefficients between fibers 1 and 2, fibers 2 and 3, and fibers 3 and 4, respectively. Basically speaking, this tells us that coupling length is inversely proportional to the coupling coefficient times some factor, this factor being a function of certain ratios between the coupling coefficients.

N×N Fiber Couplers for Wide-Band Coupling

From the solution of the N×N identical-fiber linear-array coupler given below, we can see there are only two constants that will affect the coupling ratio between any two fibers: k, the coupling constant, and z, the coupling length. Restating this in mathematical terms, for each particular coupler in which we have N identical fibers fused side-by-side along identical fused joints, we have only two degrees of freedom—the coupling coefficient and the coupling length. When we have N fibers, N being an integer greater than two, and when we want to provide a specific coupling power ratio for each of these N output fibers, we don't have enough parameters to control or vary to allow us to reliably fabricate our coupler.

While real-world imperfections may allow us to occasionally achieve a fairly even power split among three fibers, it will be very difficult to manufacture N×N couplers of more than three fibers with specified output characteristics. Moreover, precisely and controllably varying the coupling constant is generally high problematic. Thus, to provide optical fiber couplers with more than three fibers, some other propagation control mechanism would be helpful.

If we preheat and pre-pull at least one of the fibers defining a fused fiber—fiber joint, we will vary the coupling constant across that joint. By selectively varying pulling length and time of the fused fibers, we can use this effect to provide different coupling constants for each of the N−1 fused joint in a linear-array of N fibers. We can designate these joints as follows:

$$K_{1,2}, K_{2,3}, \ldots N_{n-1,n},$$

and we can control the values of the coupling constants (and the corresponding ratios therebetween) by controlling pre-pull length and time.

Varying the individual coupling coefficients across the linear-array, generally by varying the pre-pulling length and time, gives us N degrees of freedom we can control. By selecting pre-pull time and length properly, we can use this mechanism to provide any arbitrary coupling ratios we want for our N output fibers.

Applying weak-guided wave theory, we can analyze the propagation between two adjacent fibers of a linear-array in isolation. This simplification is fairly reasonable for the linear-array geometry: for N×N (or 1×N) linear-array couplers, the coupling performance between each pair of adjacent fibers will be very similar to the propagation between each of the fibers in a 2×2 (or 1×2) coupler. In fact, the coupling equations for a fused joint are only affected by the fused fibers, and these are generally linear equations, so that one fiber added or removed at a distance from the fused joint will not change the coupling performance relative to wavelength.

To provide different diameters between the two adjacent fibers, one (or both) is pre-pulled so that it has a smaller diameter (or the two fibers are pre-pulled by different amounts). This difference in fiber diameters generally results in different propagation constants in each fiber. In turn, this difference in propagation constants generally avoids coupling ratios of 100% between one fiber and the other fiber, as the light signals will travel at different speeds in the two fibers so that their phases are not matched.

Building further upon this reasoning, we can show that it's possible to reach some arbitrary coupling ratio between our two fibers for different wavelengths. Still considering our two different fibers, the coupling ratio from the first fiber to the second fiber will be:

$$P_2/P_1 = \frac{k^2}{k^2 + \delta^2} \sin^2 \sqrt{k^2 + \delta^2}\, z.$$

Where k is the coupling constant, $\delta = \beta_a - \beta_b$ is the difference between two propagation constants, and z is the coupling length. Returning to our earlier uniform fiber case, $\beta_a = \beta_b$ (so that $\delta = 0$), giving us:

$$P_2/P_1 = \sin^2 kz$$

However, we know that if we consider two different arbitrary wavelengths, wherein the two wavelengths are relatively close, each wavelength will have a different coupling coefficient k. As both wavelengths will have the same coupling length z, the coupling ratios will generally not be equal. However, If $\beta_a \neq \beta_b$ (so $\delta \neq 0$), $$\frac{k^2}{k^2 + \delta^2} \text{ and } \sqrt{k^2 + \delta^2}$$

are two independent parameters we can control. By properly selecting the pre-pull (or pre-pull ratios), we can have $$P_2(\lambda_2)/P_1(\lambda_2) = P_2(\lambda_1)/P_1(\lambda_1) \text{ for different wavelengths, i.e., } \lambda_1 \neq \lambda_2.$$

Mathematically, $$\text{if } I(\lambda) = P_2/P_1$$

$$A(\lambda) = \frac{k^2}{k^2 + \delta^2}$$

$$\beta(\lambda) = \sqrt{k^2 + \delta^2}$$

then $I(\lambda) = A(\lambda)\sin^2[\beta(\lambda)z]$.

Since we can pre-pull at least one of our two adjacent fibers, and since we can also fuse these two adjacent fibers while pulling both of them together, we can control $A(\lambda)$ and $\beta(\lambda)$ independently. By properly setting our pre-pull amount we can have $$I(\lambda_1) = I(\lambda_2) \text{ (for } \lambda_1 \neq \lambda_2\text{)}.$$

If we set $\beta(\lambda)$ properly, we can also establish a very long period for the function $I(\lambda)$. In other words, for wavelengths $$\lambda_1 < \lambda < \lambda_2 \text{ (where } \lambda_2 > \lambda_1\text{)},$$

we can provide $I(\lambda) \equiv I(\lambda_1) = I(\lambda_2)$. This means we can provide a truly effective wideband coupler: a coupling having, throughout a relatively wide region from $\lambda_1$ to $\lambda_2$, a nearly unchanging coupling power ratio.

Figure 9A:
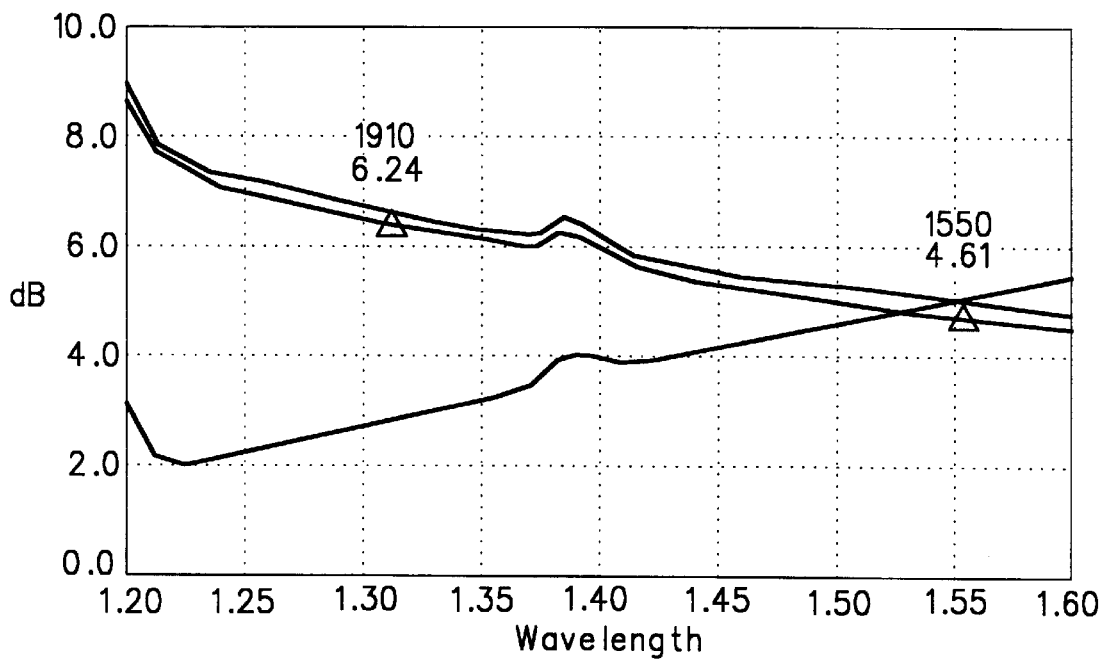
FIGS. 9A and 9B illustrate the improvement in bandwidth provided by pre-pulling selected fibers of a linear-array.
Figure 9B:
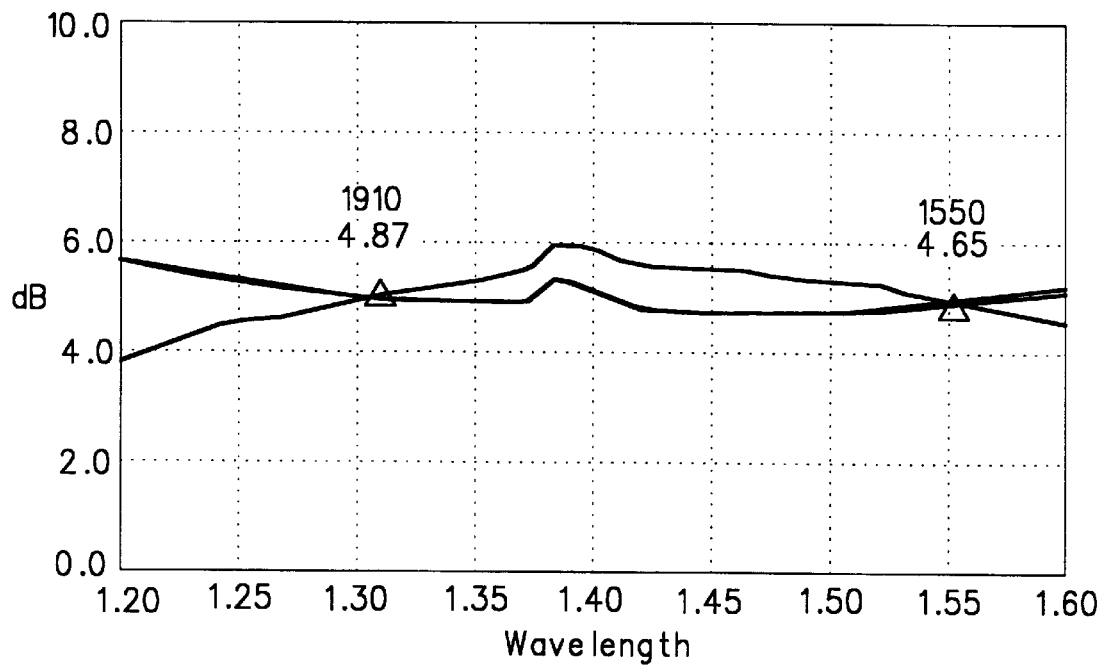

Referring now to FIGS. 9A and 9B, the bandwidth improvement provided by pre-pulling selected fibers of a linear-array is illustrated for an optical coupler of 3 fibers, similar to that shown in FIG. 3A. FIG. 9A illustrates the insertion loss characteristics at different bandwidths for an optical coupler having three uniform fibers. While the insertion loss (and thus the power ratio) at each of the three output fibers is fairly even at a wavelength of 1550 nm, performance degrades significantly as the wavelength varies from this nominal value. However, by pre-pulling the inner fiber 10F, the insertion loss characteristics can be substantially flattened to provide approximately even insertion losses over a much broader range of signal wavelengths, as shown in FIG. 9B. Thus, the above analysis is also applicable to linear-array couplers having some number of fibers other than four.

For an N×N (or 1×N) coupler, the mathematical expression of the coupling ratio for N identical fibers is similar to that give above for two fibers: It is a linear combination of sin (kz) and cos (kz). Similarly, for identical fibers, we don't have enough parameters (or degrees of freedom) to control the output intensities at each of the N fibers, and it is difficult to provide the same coupled power ratio for different wavelengths. In fact, it is difficult to even provide a desired coupling ratio among three fibers for a single wavelength.

On the other hand, with proper pre-pull techniques, we can selectively vary the propagation constants of each fiber, and, even more importantly, can vary the ratios of the coupling coefficients across a linear-array coupler. This variability provides at least N parameters to control, making it possible to provide even power splitting over a range of different wavelengths, or even allowing the coupled power ratio to be selected at specific wavelengths. FIGS. 10A–D illustrate just a few of the power splitting characteristics which can result.

Figure 10A:
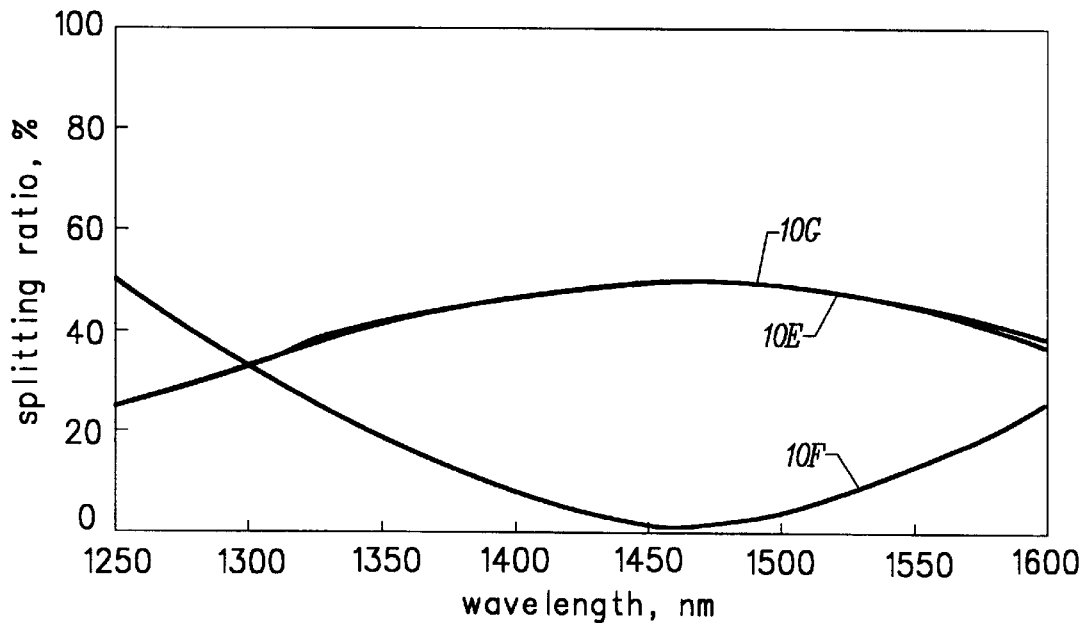
FIGS. 10A–10D illustrate optic coupler power ratios for linear array optic fiber couplers having three fibers, in which the variation in power ratio versus wavelength provide a variety of specific target characteristics which are advantageous for use in optic fiber networks.
Figure 10B:
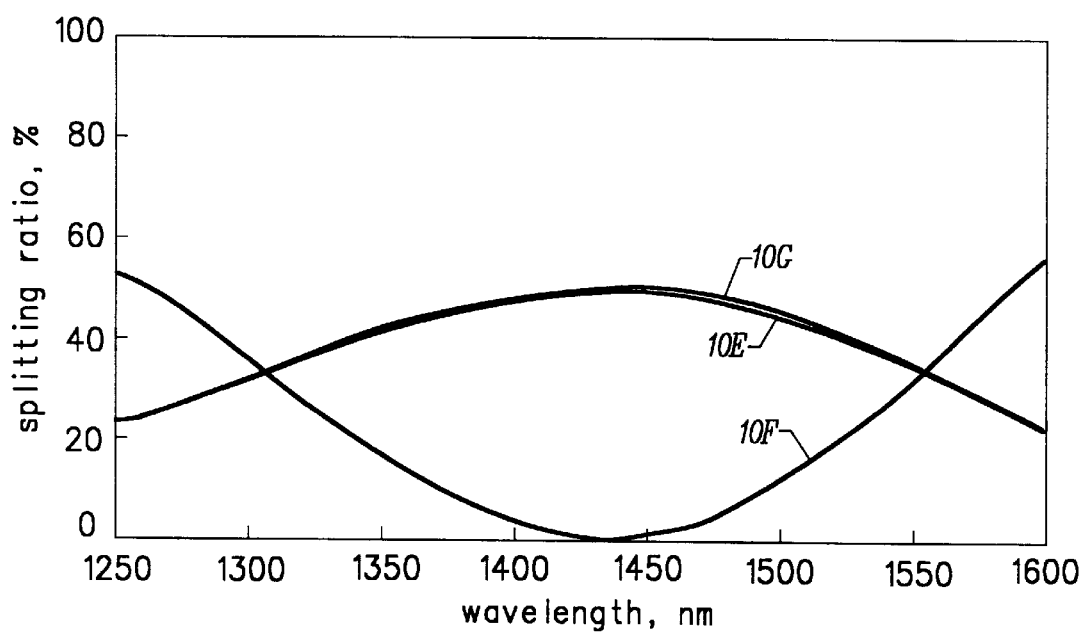

In FIG. 10A, selective pre-pulling provides a single window 1×3 or 3×3 coupler for use when even power splitting is desired only for one target wavelength at the output of fibers 10E–G, using the fiber numbering from FIG. 3A. The coupler of FIG. 10B provides a similar dual window 1×3 or 3×3 coupler in which the pre-pulling mechanism is used to provide an even power split at two target frequencies.

Figure 10C:
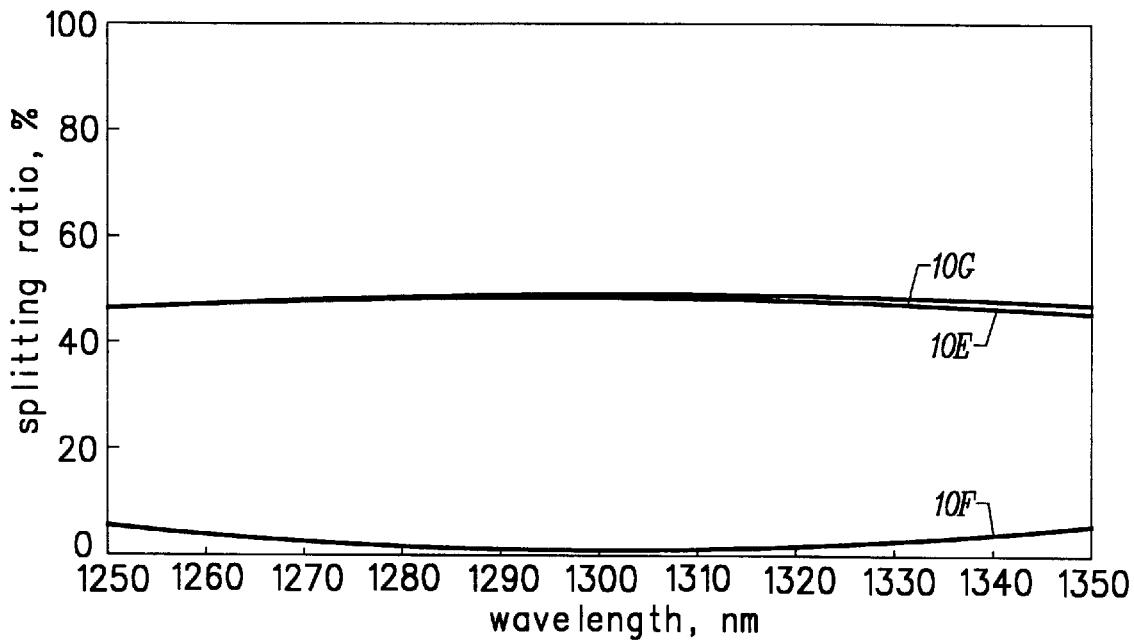

An ultra-wide bandwidth selectively pre-pulled linear-array 1×2 or 2×2 coupler can be produced having the structure of FIGS. 3 and 3A, as illustrated in FIG. 10C. In this embodiment, one or more of the fibers are pre-pulled, and the parallel portion of the fused fibers are then heated and pulled until the power output at the inner fiber is less than half the power output of each of the two edge fibers throughout a broad range of signal wavelengths, and until the two edge fibers exhibit a substantially even power split throughout the same range. The range will preferably extend ±30 nm about a target frequency, typically about the nominally coherent frequency of a semiconductor laser.

Figure 10D:
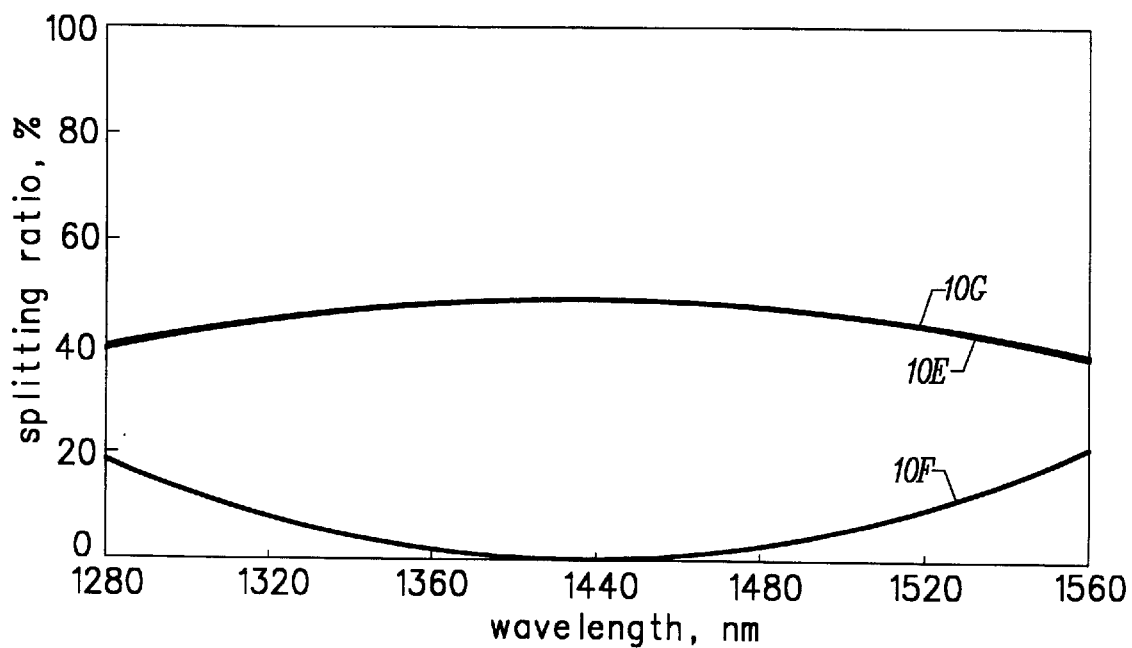
Figure 11:
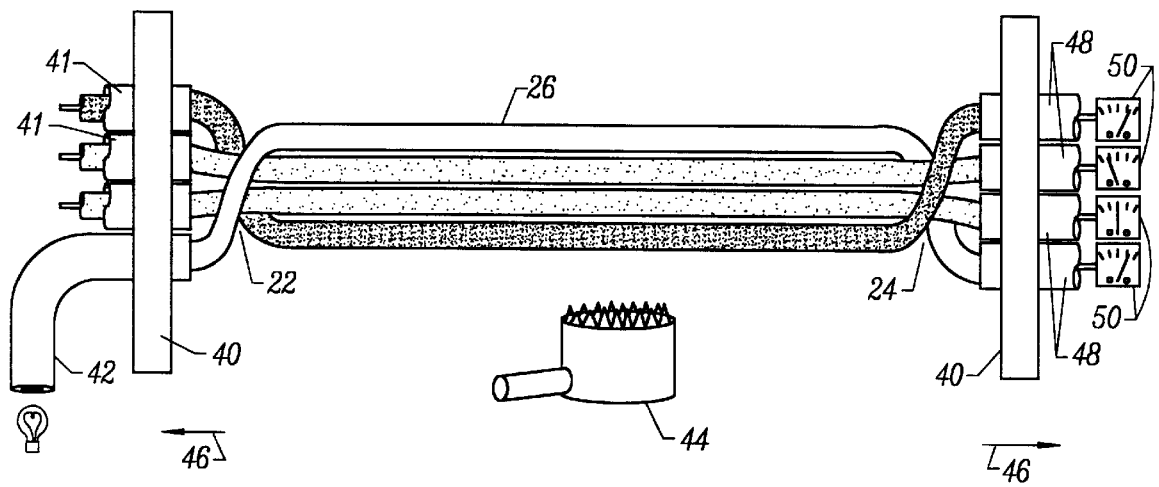
FIG. 11 illustrates a method of making the fiber optic coupler of FIG. 2.

Alternatively, the two edge fibers may have a substantially even power split, while the inner fiber has a lower signal output power which is sufficient to monitor the signal with a sensor mounted near the output end of the middle fiber. Such a coupler is shown in FIG. 10D. The lower output at the inner fiber can be substantially less than the even power supplied to the edge fibers, ideally being less than half the even power at the edge fibers so that the signal transmitted by the edge fibers is more robust than would be provided by an even power split among all three fibers. Optionally, the low power fiber provides a monitor port which allows local sensing of the coupled signal. In either case, the presence of the third fiber generally provides an additional control variable to decrease bandwidth sensitivity over a broader range of frequencies relative to two fiber 1×2 or 2×2 couplers. Those of skill in the art will recognize that linear-array couplers having 4 or more fibers may also be provided having power split characteristics analogous to those of FIGS. 10A–D.

Advantageously, fabrication of fiber optic couplers having any of the power output characteristics shown in FIGS. 10A–D can utilize common initial steps. Generally, jackets 41 are removed from an intermediate portion of the fibers to be coupled, typically exposing about 30 mm of the fiber cladding. One or more of the fibers is pre-pulled to vary its propagation constant, as described above. A clip 40 engages the fibers, preferably over the remaining jacketed portion, and restrains them in the side-by-side linear-array configuration.

The edge fibers 10A, 10D are then twisted across at least some of the inner fibers to form the first twist 22. The twisted portion of the edge fibers will generally by unjacketed, and the twist will typically define one-half of a full rotation, so that the edge fibers switch positions as shown. The inner fibers 10B, 10C will typically (although not necessarily) remain substantially parallel through the twist. The second twist 24 is formed in a similar manner, so that the edge fibers ideally define a full rotation about the linear-array through the two twists. A second clip 40 holds the jacketed fibers so that the twists are between the clips.

A needle-like tool is used to ensure that each twist is as close as possible to the adjacent clip, maximizing the length of parallel portion 26 therebetween. The clips are affixed to movable stages which move outward to pull the fibers axially.

The substantially parallel portion is heated with a torch 44, and the fibers are pulled axially in the direction of arrows 46. The twists provide a lateral force which pushes the fibers together, promoting fusing between the adjacent heated fibers. While the fibers are pulled, the light intensity at an output end 48 of each fiber 10 is monitored by a sensor 50. Once the output matches the desired coupler output characteristics, the pulling to the fibers stops. Advantageously, the pulling can stop when the coupler exhibits any of a family of predetermined coupler power characteristics, including characteristics similar to those shown in FIGS. 10A–D, thereby reducing rejection rates over known coupler fabrication methods which seek only a single coupler type.

Figure 12:
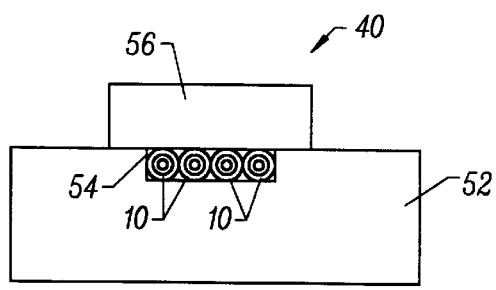
FIG. 12 illustrates a clip which holds the optic fibers in a single row, for use in the method of FIG. 11.

An exemplary clip 40 is illustrated in FIG. 12. The clip comprises a metal body 52 having a groove 54 which fittingly receives the optic fibers to be fused together, so as to restrain the fibers in a single row. Ideally, the groove is sized to engage jacketed portions of the fibers, as described above. A simple presser 56 holds the fibers in the groove, the presser ideally comprising an elastomer such as rubber.

While the above description of the specific embodiments has been given in some detail, for reasons of alterations will be obvious to those of skill in the art. Therefore, the scope of the present invention is limited solely by the following claims.

What is claimed is:

1. A fiber optic coupler comprising:
   a plurality of optic fibers, the optic fibers coupled side-by-side along a coupled length and having input ends and output ends extending from the coupled length, wherein a propagation constant of a first of the optic fibers is different than propagation constants of two of the optic fibers along the coupled length.

2. A fiber optic coupler as in claim 1, wherein at least two of the plurality of optic fibers comprise inner fibers which are coupled between two adjacent optic fibers, two of the optic fibers comprising edge fibers which are coupled directly to only one inner fiber along at least a portion of the coupled length.

3. A fiber optic coupler as in claim 1, wherein output light signals of substantially uniform power are produced at the output ends of the plurality of optic fibers when a light signal is introduced at the input end of at least one of the optic fibers.

4. A fiber optic coupler as in claim 2, wherein the inner fibers are coupled between only two adjacent fibers along the at least a portion of the coupled length so that each of the fibers are disposed side-by-side in a single row to define a linear-array.

5. A method for using optic fiber couplers comprising:
   providing a plurality of optic fibers coupled side-by-side so as to define a linear array, at least one of the optic fibers having a propagation constant which is different than another of the optic fibers; and
   introducing a light signal at an input end of at least one of the optic fibers which produces output light signals of substantially uniform power at output ends of the plurality of optic fibers.

6. A method as claimed in claim 5, wherein the optic fibers are coupled along a coupled length.

7. An output light signal of substantially uniform power which is created with the method recited in claim 5.

* * * * *